(12) United States Patent
Nelson

(10) Patent No.: US 11,599,370 B2
(45) Date of Patent: Mar. 7, 2023

(54) DEVICE CONTROL APP WITH ADVERTISING

(71) Applicant: AUTOMOBILITY DISTRIBUTION INC., Montreal (CA)

(72) Inventor: Robert Nelson, Westmount (CA)

( * ) Notice: Subject to any disclaimer, the term of this patent is extended or adjusted under 35 U.S.C. 154(b) by 307 days.

(21) Appl. No.: 16/336,248

(22) PCT Filed: Sep. 4, 2018

(86) PCT No.: PCT/CA2018/051060
§ 371 (c)(1),
(2) Date: Mar. 25, 2019

(87) PCT Pub. No.: WO2019/041051
PCT Pub. Date: Mar. 7, 2019

(65) Prior Publication Data
US 2019/0258494 A1     Aug. 22, 2019

Related U.S. Application Data

(60) Provisional application No. 62/553,657, filed on Sep. 1, 2017.

(51) Int. Cl.
*G06F 9/451*          (2018.01)
*G06Q 30/0251*     (2023.01)
*G06Q 30/02*        (2023.01)

(52) U.S. Cl.
CPC .............. *G06F 9/451* (2018.02); *G06Q 30/02* (2013.01); *G06Q 30/0253* (2013.01); *G06Q 30/0265* (2013.01)

(58) Field of Classification Search
CPC .... G06F 16/5854; G06F 21/31; G06F 21/629; G06F 3/048; G06F 3/04842; G06F 3/0488; G06F 9/451; H04W 4/021; G06Q 30/0207; G06Q 30/02; G06Q 20/223; G06Q 30/0224; G06Q 30/0251; G06Q 30/0253; G06Q 30/0265; H04L 67/18
See application file for complete search history.

(56) References Cited

U.S. PATENT DOCUMENTS 5,832,298 A    11/1998   Sanchez et al.
5,905,492 A *   5/1999   Straub ..................... G06F 9/451
                                                              715/744

(Continued)

FOREIGN PATENT DOCUMENTS

CN    104951327 A    9/2015
CN    106603342 A    4/2017

OTHER PUBLICATIONS

R. Will, S. Ramaswamy and T. Schaeck, "WebSphere Portal: Unified user access to content, applications, and services," in IBM Systems Journal, vol. 43, No. 2, pp. 420-429, 2004, doi: 10.1147/sj.432.0420. (Year: 2004).*

(Continued)

*Primary Examiner* — Tuyetlien T Tran

(57) ABSTRACT

Devices, to be controlled by an application program (app) running on mobile computers of the users, are sold to the users through a variety of suppliers. The users are provided with a single generic app for controlling the devices. The app is then provided branding and advertising information about one supplier associated with the sale or service of the devices.

12 Claims, 36 Drawing Sheets

(56) References Cited

U.S. PATENT DOCUMENTS

| | | | |
|---|---|---|---|
| 6,791,581 B2* | 9/2004 | Novak | G06T 11/00 715/744 |
| 6,859,197 B2* | 2/2005 | Klein | G06F 1/1626 345/156 |
| 7,076,255 B2* | 7/2006 | Parupudi | H04M 1/72563 455/456.1 |
| 7,093,198 B1 | 8/2006 | Paatero et al. | |
| 7,111,242 B1 | 9/2006 | Grooters | |
| 7,178,161 B1* | 2/2007 | Fristoe | H04L 29/06027 348/E7.073 |
| 7,366,892 B2* | 4/2008 | Spaur | B60R 25/04 713/151 |
| 7,631,260 B1* | 12/2009 | Riggs | G06F 16/958 715/716 |
| 8,069,125 B2* | 11/2011 | Jung | A61B 5/04842 706/11 |
| 8,265,862 B1* | 9/2012 | Zilka | G01C 21/362 701/414 |
| 8,346,310 B2* | 1/2013 | Boll | H04W 4/00 455/569.2 |
| 8,356,004 B2* | 1/2013 | Jung | A61B 5/744 706/62 |
| 8,666,363 B2 | 3/2014 | Kenagy et al. | |
| 8,762,463 B2 | 6/2014 | Ravichandran et al. | |
| 8,848,608 B1* | 9/2014 | Addepalli | H04W 72/0406 370/328 |
| 8,995,981 B1* | 3/2015 | Aginsky | G08C 17/02 455/419 |
| 9,031,545 B1* | 5/2015 | Srey | H04W 4/046 455/418 |
| 9,037,979 B2* | 5/2015 | Park | H04N 21/858 715/744 |
| 9,123,074 B2* | 9/2015 | Jacobs | G06Q 30/0643 |
| 9,135,612 B1* | 9/2015 | Proctor, Jr. | G06Q 30/0266 |
| 9,183,560 B2* | 11/2015 | Abelow | G06Q 10/10 |
| 9,184,777 B2 | 11/2015 | Esselink et al. | |
| 9,272,714 B2* | 3/2016 | Rao | B60W 40/09 |
| 9,294,822 B2* | 3/2016 | McLauchlan | G11B 27/036 |
| 9,367,968 B2 | 6/2016 | Giraud et al. | |
| 9,418,368 B2* | 8/2016 | Jung | G06F 16/273 |
| 9,424,259 B2* | 8/2016 | Thomes | G06F 16/44 |
| 9,430,476 B2* | 8/2016 | Bai | G06F 16/435 |
| 9,443,270 B1 | 9/2016 | Friedman | G06Q 40/08 |
| 9,466,153 B2 | 10/2016 | Fischer et al. | |
| 9,754,355 B2* | 9/2017 | Chang | G06K 9/48 |
| 10,073,922 B2* | 9/2018 | Borshack | G06Q 30/02 |
| 10,362,536 B2* | 7/2019 | Mathews | H04W 52/0216 |
| 2001/0042002 A1* | 11/2001 | Koopersmith | G06Q 30/02 705/26.3 |
| 2002/0083446 A1* | 6/2002 | Eaton | G08B 5/229 725/37 |
| 2002/0128908 A1* | 9/2002 | Levin | G06Q 30/02 705/14.53 |
| 2002/0149618 A1* | 10/2002 | Estrada | G06Q 10/10 715/760 |
| 2003/0028451 A1* | 2/2003 | Ananian | G06Q 30/02 705/26.42 |
| 2004/0056890 A1* | 3/2004 | Hao | G06F 9/451 715/744 |
| 2004/0070609 A1* | 4/2004 | Estrada | G06F 16/958 715/751 |
| 2004/0098467 A1* | 5/2004 | Dewey | H04L 67/02 709/219 |
| 2004/0122735 A1* | 6/2004 | Meshkin | G06Q 30/02 705/14.27 |
| 2004/0193482 A1* | 9/2004 | Hoffman | G06Q 30/0273 705/14.69 |
| 2004/0216054 A1 | 10/2004 | Mathews et al. | |
| 2005/0086612 A1* | 4/2005 | Gettman | G06Q 30/02 715/848 |
| 2005/0144072 A1* | 6/2005 | Perkowski | G06Q 30/0277 705/14.49 |
| 2005/0228724 A1* | 10/2005 | Frangiosa | G06Q 20/342 705/26.1 |
| 2005/0266879 A1* | 12/2005 | Spaur | H04L 12/4625 455/556.2 |
| 2006/0020477 A1 | 1/2006 | Retzbach et al. | |
| 2006/0085255 A1* | 4/2006 | Hastings | G06Q 30/02 705/14.4 |
| 2006/0123053 A1* | 6/2006 | Scannell, Jr. | G06F 16/437 |
| 2006/0278064 A1* | 12/2006 | Lourdeaux | H04L 67/22 84/609 |
| 2007/0197261 A1* | 8/2007 | Humbel | G06Q 30/00 455/558 |
| 2007/0250901 A1* | 10/2007 | McIntire | H04N 21/8586 725/146 |
| 2008/0065792 A1* | 3/2008 | Wu | G06F 9/451 710/16 |
| 2008/0250190 A1* | 10/2008 | Johnson | G06F 11/3048 711/103 |
| 2009/0030718 A1* | 1/2009 | Bengson | G06Q 30/00 705/313 |
| 2009/0106036 A1 | 4/2009 | Tamura et al. | |
| 2009/0106104 A1* | 4/2009 | Upendran | H04N 21/4312 705/14.5 |
| 2009/0106663 A1* | 4/2009 | Pirie | H04M 1/72563 715/744 |
| 2009/0113318 A1* | 4/2009 | Roseway | G06F 3/0481 715/762 |
| 2009/0192869 A1* | 7/2009 | Irvine | G06Q 30/0212 705/7.29 |
| 2009/0228325 A1* | 9/2009 | Simmons | G06Q 10/06313 705/7.23 |
| 2009/0228397 A1* | 9/2009 | Tawakol | G06Q 30/0601 705/80 |
| 2009/0248503 A1* | 10/2009 | Fisher | G06Q 30/02 705/14.58 |
| 2009/0254529 A1* | 10/2009 | Goldentouch | G06F 40/169 |
| 2009/0307058 A1* | 12/2009 | Murphy | G06Q 30/0255 705/7.29 |
| 2010/0063892 A1* | 3/2010 | Keronen | G06Q 30/04 705/26.1 |
| 2010/0114857 A1* | 5/2010 | Edwards | G06F 16/743 707/709 |
| 2010/0153865 A1* | 6/2010 | Barnes | H04L 67/10 715/762 |
| 2010/0280956 A1* | 11/2010 | Chutorash | G06Q 20/20 705/64 |
| 2011/0055005 A1* | 3/2011 | Lang | G06Q 30/02 705/14.45 |
| 2011/0178831 A1* | 7/2011 | Ravichandran | G06Q 30/0251 705/7.11 |
| 2011/0178866 A1* | 7/2011 | Levine | G06Q 30/0247 705/14.43 |
| 2011/0188836 A1* | 8/2011 | Popkiewicz | G06Q 30/0241 386/278 |
| 2011/0208822 A1* | 8/2011 | Rathod | G06F 16/9535 709/206 |
| 2011/0251888 A1* | 10/2011 | Faith | G06Q 20/32 705/14.43 |
| 2011/0276386 A1* | 11/2011 | Deemer | G06Q 30/02 705/14.39 |
| 2011/0282748 A1* | 11/2011 | Ciurea | G06Q 30/02 705/14.64 |
| 2011/0300902 A1* | 12/2011 | Kwon | G06Q 30/02 455/556.1 |
| 2011/0314051 A1* | 12/2011 | Cavet | G06Q 30/02 707/769 |
| 2012/0042036 A1* | 2/2012 | Lau | G06F 8/61 709/217 |
| 2012/0190386 A1* | 7/2012 | Anderson | G01S 19/14 455/456.3 |
| 2012/0209692 A1* | 8/2012 | Bennett | G06Q 30/0207 705/14.39 |
| 2012/0246572 A1 | 9/2012 | Tu | |
| 2012/0289147 A1* | 11/2012 | Raleigh | H04N 21/6547 455/3.06 |

(56) References Cited

U.S. PATENT DOCUMENTS

| | | | |
|---|---|---|---|
| 2012/0323690 A1* | 12/2012 | Michael | G06Q 30/02 |
| | | | 705/14.58 |
| 2013/0099892 A1 | 4/2013 | Tucher et al. | |
| 2013/0113602 A1* | 5/2013 | Gilbertson | G05B 1/01 |
| | | | 340/5.52 |
| 2013/0132854 A1* | 5/2013 | Raleigh | H04W 4/60 |
| | | | 715/738 |
| 2013/0159081 A1* | 6/2013 | Shastry | G06Q 30/0274 |
| | | | 705/14.23 |
| 2013/0166580 A1* | 6/2013 | Maharajh | H04W 4/18 |
| | | | 707/758 |
| 2013/0175337 A1* | 7/2013 | Briancon | G06Q 30/02 |
| | | | 235/375 |
| 2013/0203345 A1* | 8/2013 | Fisher | H04B 11/00 |
| | | | 455/41.1 |
| 2013/0212201 A1* | 8/2013 | Walters | H04L 51/08 |
| | | | 709/206 |
| 2013/0254296 A1* | 9/2013 | Lai | H04L 65/40 |
| | | | 709/205 |
| 2013/0297352 A1 | 11/2013 | Noe et al. | |
| 2013/0346148 A1* | 12/2013 | Roth | G06Q 30/0201 |
| | | | 705/7.29 |
| 2014/0137188 A1* | 5/2014 | Bartholomay | G06Q 30/0251 |
| | | | 726/3 |
| 2014/0165037 A1 | 6/2014 | Brun et al. | |
| 2014/0180788 A1* | 6/2014 | George | G06Q 30/0277 |
| | | | 705/14.41 |
| 2014/0244488 A1* | 8/2014 | Kim | G06Q 40/00 |
| | | | 705/39 |
| 2014/0358666 A1* | 12/2014 | Baghaie | G06Q 30/0267 |
| | | | 705/14.41 |
| 2015/0019614 A1* | 1/2015 | Pierre-March | H04L 67/10 |
| | | | 709/201 |
| 2015/0039609 A1* | 2/2015 | Weinstein | G06F 15/17306 |
| | | | 707/734 |
| 2015/0045013 A1* | 2/2015 | Simmons | G07C 5/008 |
| | | | 455/420 |
| 2015/0058744 A1* | 2/2015 | Dhingra | G06F 9/451 |
| | | | 715/747 |
| 2015/0073929 A1* | 3/2015 | Psota | G06Q 50/28 |
| | | | 705/26.2 |
| 2015/0287257 A1 | 10/2015 | Thompson | |
| 2016/0035004 A1* | 2/2016 | Garcia-Martinez | G06F 17/00 |
| | | | 705/26.7 |
| 2016/0055699 A1* | 2/2016 | Vincenti | G07C 9/00309 |
| | | | 340/5.61 |
| 2016/0132936 A1* | 5/2016 | Hertel | G06Q 30/0269 |
| | | | 705/14.66 |
| 2016/0165285 A1* | 6/2016 | Toh | G06F 13/00 |
| | | | 725/14 |
| 2016/0210602 A1* | 7/2016 | Siddique | G06Q 10/0637 |
| 2016/0239854 A1* | 8/2016 | Neal | G06F 16/252 |
| 2016/0255493 A1* | 9/2016 | Lihosit | H04L 41/0893 |
| | | | 455/419 |
| 2016/0259491 A1* | 9/2016 | Jacobs | H04W 4/00 |
| 2017/0200197 A1* | 7/2017 | Brubaker | G09F 9/35 |
| 2017/0213464 A1* | 7/2017 | Emadi | G08G 1/144 |
| 2017/0249625 A1* | 8/2017 | Vossoughi | G07B 15/02 |
| 2018/0025180 A1* | 1/2018 | Wang | G06F 21/6281 |
| | | | 726/1 |
| 2018/0143743 A1* | 5/2018 | Bhogal | G06F 3/0482 |
| 2018/0234718 A1* | 8/2018 | Ananthapur Bache | |
| | | | H04N 21/42221 |
| 2019/0066063 A1* | 2/2019 | Jessamine | G06F 21/31 |
| 2019/0102929 A1* | 4/2019 | Davis | G06F 21/6209 |
| 2019/0104190 A1* | 4/2019 | Justin | H04L 67/26 |
| 2019/0121628 A1* | 4/2019 | Hu | G06F 8/61 |

OTHER PUBLICATIONS

FordPass Manual App Training. Manual [online]. Ford Motor Company, Jun. 15, 2016, https://chastang.sirv.com/ford/clp/ford-pass/FordPass_Manual_App_Training.pdf.
PCT/CA2018/051060 ISR.
PCT/CA2018/051060 search strategy.
PCT/CA2018/051060 written opinion.
Viper Smartstart Quick Reference User's Guide Vss3001 Remote Start with Keyless Entry. Guide [online]. Viper, Sep. 12, 2013 https://www.directeddealers.com/manuals/og/viper/VSS3001-QR-Guide.pdf.

* cited by examiner

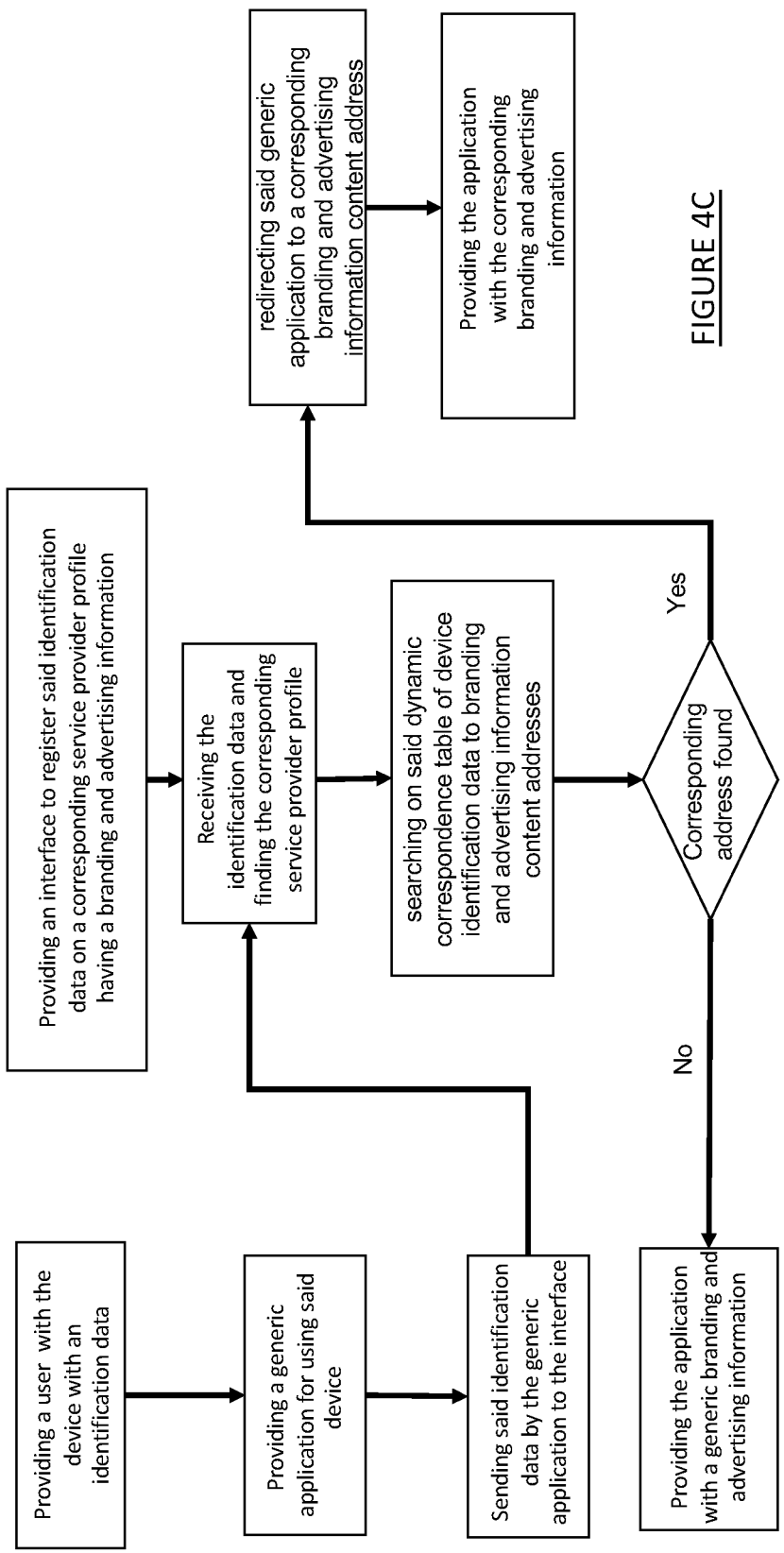

MyBrandedApp  Home  Register  Log In

Please fill in the form below to create your retailer account.

Fields with an asterisk (*) are mandatory.

Retailer Information

Retailer address lookup

- Chemin de la Cote-de-Liesse, Saint-Laurent QC. Canada
- Costa na Senac, Bratislava-Ruztnov, Slovakia
- Donozemska cesta, Bratislava-Petzake, Slovakia
- Vajorska, Bratislava-Nove Mesto, Slovakia
- Vajorska, Bratislava, Slovakia Powered by Google Street name detail     City*

State/Province*     Country*     Zip code*

Dealer Account Creation Using Google Maps Data

Figure 13

MyBrandedApp  Home                                    Register   Log In

Please fill in the form below to create your retailer account.

Fields with an asterisk (*) are mandatory.

Retailer Information

Retailer address lookup
[                    ]

This will automatically fill the following fields

Retailer name*
[                                    ]

Street number*          Street name*
[ 3535        ]         [                    ]

Street name detail      City*
[             ]         [ Montreal           ]

State/Province*         Country*              Zip code*
[ QC          ]         [ Canada    ]         [          ]

Dealer Account Creation Using Google Maps Data

Figure 14

MyBrandedApp  Home                                    Register    Log In

Phone number*          Ext.
[                  ]   [      ]

Service Phone number*  Ext.
[                  ]   [      ]

Web Site
https://
Contact email
info@
Facebook pageSite
https://www.facebook.com/

Opening hours
Enter only integer numbers or keep empty if closed.
Sunday                                Monday Dealer Account Creation Adding Contact Info

Dealer Interface Create New Theme

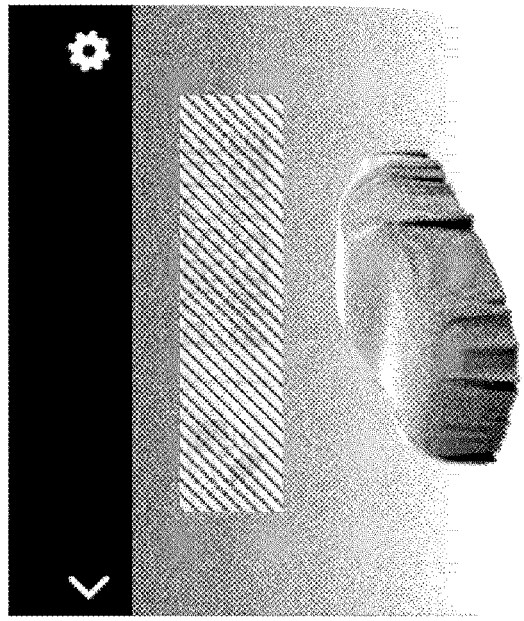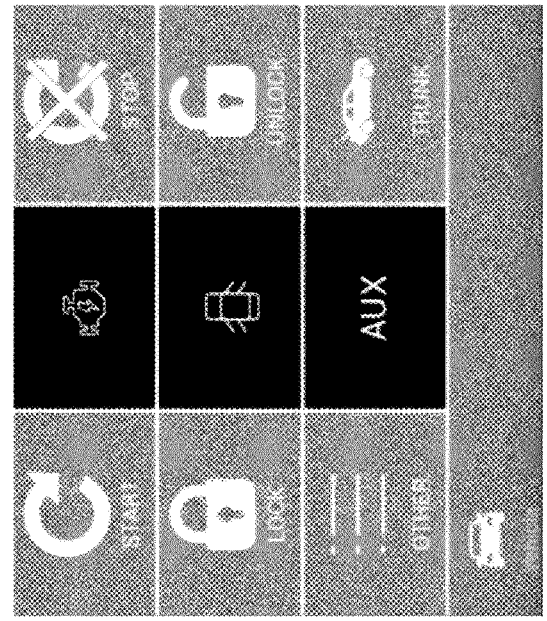
Figure 34
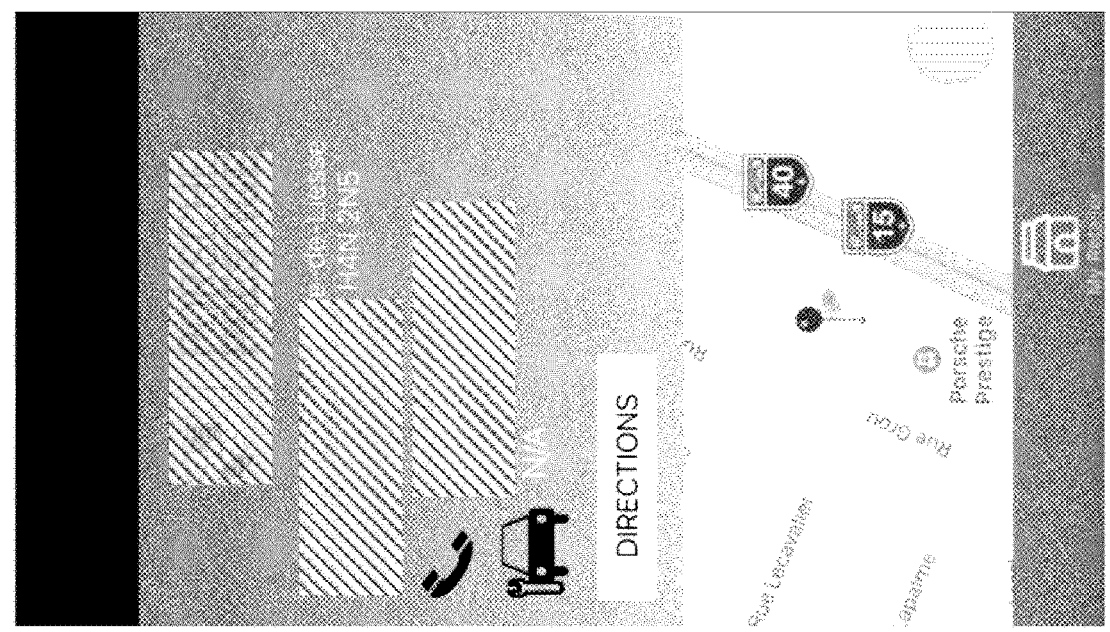
Figure 33

DEVICE CONTROL APP WITH ADVERTISING

This application claim priority of U.S. provisional patent application Ser. No. 62/553,657 filed Sep. 1, 2017, the contents of which are hereby incorporated by reference.

TECHNICAL FIELD

The present application generally relates to electronic devices having a user application on a computing device, for example, vehicle accessories, and more specifically to systems for providing branding and advertising information using a user application for using with a device.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

It is common to use smartphone and computer applications also known as applications "apps" for the purposes of providing a user interface for controlling a device such as a car accessory. Such apps are generally designed for operating the devices and are provided by the device manufacturers. FIGS. 1 and 2 illustrate an example of an available car device system such as a remote starter working with an application.

Advertising is important in any industry and automotive aftermarket and car servicing industry is not an exemption to this rule. As many car accessories are installed by technicians, the end user typically does not get exposure to the advertisement typically available through packaging for other products. Hence, there exists a need for a system for car service providers and dealerships to effectively deliver the advertisement of their brand, products and services and promotions to appropriate end user.

While it is common to provide smartphone apps and websites that allow clients to receive marketing and/or product information, including information about product updates and maintenance, such websites and applications are typically used independently from the products. Furthermore, the information is provided through a client's action of seeking the information, through opening a link in an e-mail message or by opening an application or webpage, or by receiving a notification prompt associated with an application or RSS feed. This requires the user to voluntarily install an App or actively check the advertisement received via email. Hence, there exists a need for a system to better deliver advertisement to the end user and more effectively target the appropriate end user based on different factors such as technical information of the vehicle, the location of service provider, the location of the user's, and the available relevant promotions to avoid situations where an electrical vehicle user receives an oil change advertisement.

Moreover, there exists a need for a flexible system and method for providing customized advertisements to the end users in accordance with the criteria defined by a service provider.

SUMMARY

The present disclosure provides, inter alia, novel and innovative solutions for the above-mentioned problems.

The inconvenience and cost of the installation service for after-market vehicle accessories often hinder car owners from making purchases of after-market accessories such as remote car starters, rear view cameras, etc. Many of these devices can use smartphone apps for their control. These apps are suitable for presenting branding and/or advertising information. Applicant has found that providing in the user app such branding and/or advertising information of the service provider associated with the service provider gives the service provider an incentive to provide the installation service at a discounted rate. By discounting the cost of installation, customers are incentivized to accept purchasing after-market accessories.

Applicant has found that there is a need to include control over information provided to a user of a network controlled device, which control is made available to a party who has an on-going relationship with the user of the device, such as a dealer, a retailer or a service provider (without being the manufacturer of the device), so that pertinent information chosen by the party can delivered.

Applicant has also found that there is a need to provide such information as a part of the app's user interface at the points in time when the user chooses to control the device, so as to reduce the interruption with respect to the user in receiving such information.

In one aspect, the present disclosure provides a method for providing to users of devices, controlled by an application program running on mobile computers of the users, branding and advertising information about a supplier associated with a sale or service of the devices. The disclosed method comprises selling a number of said devices to each of a number of the suppliers or their associated agents, or service providers; providing a generic mobile computer application, or App, for using said devices as resold by the suppliers or their associated agents. The generic mobile computer application being stored on a server for download by the users and installation on the mobile computers such as a smartphone. The method further comprises determining one or more network addresses for at least one server storing the branding and advertising information about the number of said suppliers; and providing over a network in communication with the generic mobile computer application installed in said mobile computers of the users said branding and advertising information from said at least one server.

In some examples, the determining one or more network addresses of the method disclosed herein comprises storing in a database an association between an identifier of said devices and an identity of one of the suppliers, wherein the one or more network addresses is determined using said association stored in said database. In Some examples, the storing in the database the association between the identifier of said devices and the identity of one of the suppliers may comprise providing a network interface for receiving association data from said suppliers or their associated agents.

In one example of the method, the selling step may comprise storing in the database the association between the identifier of said devices and the identity of one of the suppliers. Furthermore, the selling may comprise selling to a distributor, and the storing in said database the association between the identifier of the devices and the identity of one of the suppliers comprises receiving over a computer network the identity of one of the suppliers from the distributor.

In one embodiment, the method disclosed herein comprises receiving over a data network from said generic mobile computer application the identifier of the devices, matching the identification of said devices with the suppliers in order to perform the providing over a network in communication with the generic mobile computer application installed in the mobile computers of the users the branding and advertising information from the at least one server.

In one example, the method may further comprise providing a portal interface for said suppliers to upload the branding and advertising information for storage on the at least one server.

In some embodiments, the method further comprises receiving over a data network from said generic mobile computer application data obtained about an identification of the devices also referred to as identification data, such as a serial number, and matching the identification of said devices with said suppliers in order to perform said providing over a network in communication with said generic mobile computer application installed in said mobile computers of said users said branding and advertising information from said at least one server. In one embodiment, the generic mobile computer application is configured to communicate with a predetermined address or URL. In some examples, the method further comprises providing a portal interface, also referred to herein as a service provider profile, for said suppliers to upload the branding and advertising information for storage on said at least one server.

It will be appreciated by those skilled in the art that the order of steps recited above is only by way of example and the method disclosed herein may be performed in any other orders as required.

In one example, after getting the device from a service provider or supplier, the user installs the App on a smartphone providing the information about the place of purchase or supplier such as the name of the supplier, which may be required from the user for allowing the installation, validating the warranty or any other reason. Based on the information entered the App receives the branding and advertising information and skin the App accordingly. In one example, the branding and advertisement information or skin and advertisement content may determine and cause the user to receive specific advertisement as may be defined by the service provider, device manufacturer or any other party controlling and setting up the branding and advertisement information.

Alternatively, in one example, the method may provide a service to the user of the device which may be an after-market installed automotive accessory device with a serial number or other forms of identification to a number of service providers or suppliers, dealerships or installers. In one embodiment, the present disclosure may provide an interface for use by each supplier to register the identifier each time that one of the after-market installed automotive accessory devices is installed on a vehicle. The interface may further allow the service providers to define a branding and advertising information related to the supplier for their customers. Subsequently, providing a generic mobile computing device application for using said after-market installed automotive accessory or device which is configured to receive user input related to the identifier and to communicate with a server which then provides the application with said branding and advertising information associated with one of the service providers using the user input related to said serial number.

In one example, the branding and advertising information is sent to the App based on the information provided by the user such as the name of the supplier of device while in one example, providing the application with the branding and advertising information comprises receiving by said interface said identifier sent by the generic application, searching for the branding and advertising information corresponding to the serial number, sending to said generic application said skin and advertisement content.

In a different example, providing the application with the branding and advertising information associated with one of said service providers using the user input related to said identifier further comprises searching for the identifier on a dynamic correspondence table of device serial numbers to branding and advertising information addresses, providing the generic application with a corresponding branding and advertising information address having said branding and advertising information for said application.

From what disclosed herein, it will be appreciated by those skilled in the art that, in some embodiments, allowing the service providers to define a branding and advertising information related to said vehicle sales or service center for their customers may be performed by providing the service providers with their own supplier profile to which they can log in and set up the information about the supplier branding and advertisement information such as the skin of the App or the advertisement that will be viewed by the application. In such embodiment, the profile facilitates such set up by providing an interface through which the supplier may set up their marketing campaign etc. much easier. In one embodiment, the branding and advertising information may be designed and uploaded to the interface directly without requiring a supplier profile.

In one embodiment, the device may be a car starter that works with a mobile application. The user can download a generic App from the app hosting server such as apple store and use either the supplier information, the identifier or both, for identifying and control the device using the App.

In some embodiments, a supplier can register the identifier under a corresponding supplier profile which may have a branding and advertising information. Subsequently, the generic application will be skinned using the branding and advertising information of the supplier profile upon the user initiating the application. The application may also receive advertisement and messages in addition to the skin setting through the skin and advertisement content.

In some embodiments, the supplier does not need to register each device sold and the information provided by the user would determine the branding and advertising information which will be sent to the App.

In some embodiments, the device may need to be registered and/or an initiation may be required before the App can be used to control the device. In one such example, the interface for registering the device, the dealer profile, and the branding and advertising information are located on the same server. Alternatively, in some embodiments, the interface for registering the device and the dealer profile may be found in separate servers or locations.

For example, when a user installs the generic App and connects to the interface to initiate the application, the interface asks for the identifier of device, and if such identifier is registered in accordance to a supplier profile, either within the service profile or in the correspondence table, it sends the application to the supplier profile which may be the supplier server, website etc. If the identifier is not registered with any supplier, the interface may either allow the application to continue with a generic skin or push its own skinning or advertisement or alternatively does not allow the application to be active as a safety measure.

In one embodiment, the Application may connect to the device and collect the identifier before using them for initiating the App.

The present disclosure further provides a customizable advertisement system for use with a vehicular device. The system comprises a device with an identifier such as a serial number and a transceiver providing wireless connection with the internet and/or with the cell phone via Bluetooth or local wireless connection, a computing device such as a smartphone with a customizable application for controlling the after-market automotive accessory having a branding and advertising information received from the supplier profile wherein the customizable mobile application controls the vehicular device.

In some embodiments the system may further comprise an interface to register the identifier in connection to a supplier profile which will be used to identify the device and associating it with a supplier profile, therefore, providing the corresponding branding and advertising information accordingly.

In some embodiments, in order to register the identifier or the serial number, a supplier has to log into the supplier profile and register the identifier in accordance to that specific profile. In one example, a user enters the identifier into the generic application and the system upon connecting to the interface recognizes the profile to which the identifier belongs and pushes the skinning and advertisement content of that specific profile.

In one alternative embodiment, the interface is only used to register the identifier in a table of device identifier to supplier profile addresses. When a user enters the identifier into the generic application the interface provides the generic application with information regarding the supplier profile and/or redirects the application to the supplier profile address.

It will be appreciated by those skilled in the art that the supplier profile may collocate with the interface or registration source on the same server or may be located on a completely independent server that may be hosted by the service provider.

In some embodiments, the identifier may be one or more device indicators such as a number indicated on the device which may be assigned on the interface to the dealership or supplier selling that accessory. An example of such devices is a remote car starter which allows an end user to start a car using an application on a cell phone. Nevertheless, any other identification indicator or data may be used in place or in combination with the identifier to provide further security to the device In some embodiments, the system provides a supplier with the ability to send an advertisement to an end user's application through the supplier profile. This allows the supplier to target it's promotions and advertisements more accurately.

In some examples, the system disclosed herein uses one or both of the interface and the supplier profile to communicate and control the device while the application may also control the device independently or in combination by the interface and/or the supplier profile.

In some embodiments, the system may only connect to the interface only at an initiation to activate the application and receive the kin and advertisement content while in some alternative embodiments, the application may need to connect to the interface before it can be used to control the device. In one alternative embodiment, the application requires the initial connection to be activated but may connect the supplier profile frequently to update the branding and advertising information of the application.

In one embodiment, the car device may be a remote starter which works with an application that may be installed on a user cell phone or any other end device. To use the starter, the application has to be initiated using the identifier of the accessory. This setting requires the user to open up the application every time the car starter is being, therefore, providing more effective exposure to the skinning and the advertisement.

Upon initiation, the application connects to the interface which may be the remote starter manufacturer's server to find the supplier profile corresponding to the serial number. Next, the application goes to the supplier profile to download the skin and advertisement profile assigned to said serial number. The supplier profile may be found on a different server such as the dealership or supplier server, or it may be a profile on the manufacturer's server assigned to that specific dealership. The later provides the manufacturer with the ability to provide the service providers and dealership with hosting services on an ongoing basis. In addition to the financial benefits of creating ongoing revenue for the manufacturer, this would be very desirable for smaller service providers that cannot host their own service profile.

In some embodiments, the first owner that initiates the application is recognized by the system as the owner of the device and any additional user may need a license or a key number from the owner to use the device through the application.

Furthermore, in some embodiment, the supplier or the owner may transfer the owner to another user using an application generated mechanism, through the interface or through the supplier profile.

In some embodiments, instead of having a dealer register the identifier on the interface, the manufacturers may provide car accessories and devices to dealerships and register the identifier of each device on a dynamic correspondence table of car device serial numbers to supplier profiles which belong to the specific dealership selling the accessory.

In some embodiments, the supplier can own and manage their supplier profile, or they may use the manufacturer's platform to design and maintain their supplier profile.

In some embodiment, the disclosed system provides an identifier which is registered under name of a dealership, the application user may receive only promotions and advertisements chosen by that dealership. In one embodiment, the supplier can later transfer rights in the device and advertisement on the application platform to another supplier or charge another supplier to advertise their products on their behalf.

Copyright

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BRIEF DESCRIPTION OF THE DRAWINGS

The present examples will be better understood with reference to the appended illustrations which are as follows:

FIG. 4C illustrates a flowchart of the steps taken in accordance to an example of the methods disclosed wherein a dynamic correspondence table of device identifier to branding and advertising information content addresses is used.

FIGS. 13 and 14 show screenshots of the dealer account creation page of the dealer interface in accordance with one embodiment of the present invitation.

FIG. 15 is a screenshot showing the dealer account creation adding contact info page of the dealer interface in accordance with one embodiment of the present invitation.

Figure 16:
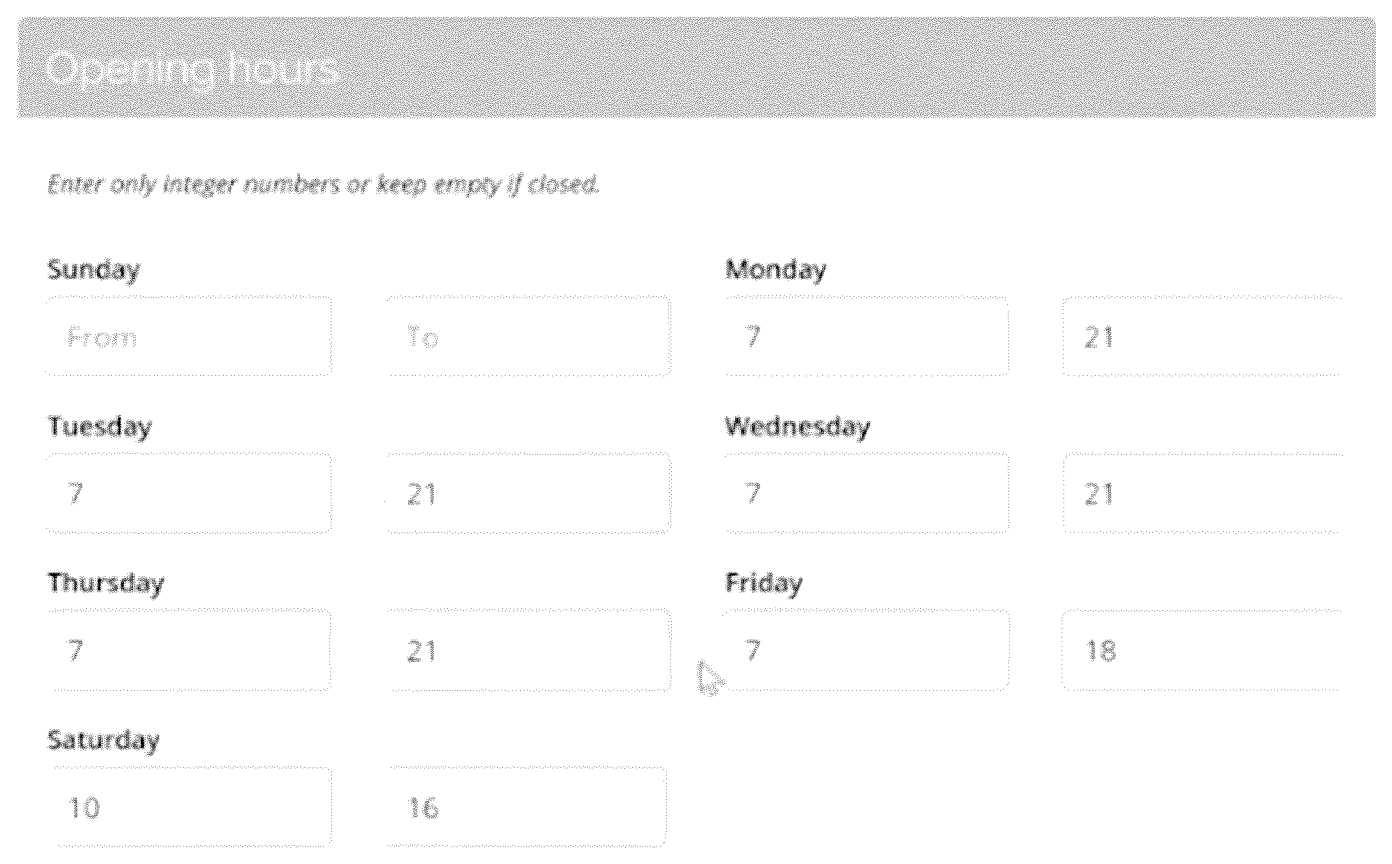

FIG. 16 is a screenshot showing the dealer account creation defining opening hours page of the dealer interface in accordance with one embodiment of the present invitation.

FIG. 17 is a screenshot showing the dealer account creation defining user information page of the dealer interface in accordance with one embodiment of the present invitation.

FIG. 33 is a screenshot showing the "my retailer" page of the user App in accordance with one embodiment of the present invitation.

FIG. 34 is a screenshot showing the "my car/vehicle" page of the user App in accordance with one embodiment of the present invitation.

DESCRIPTION

Figure 1:
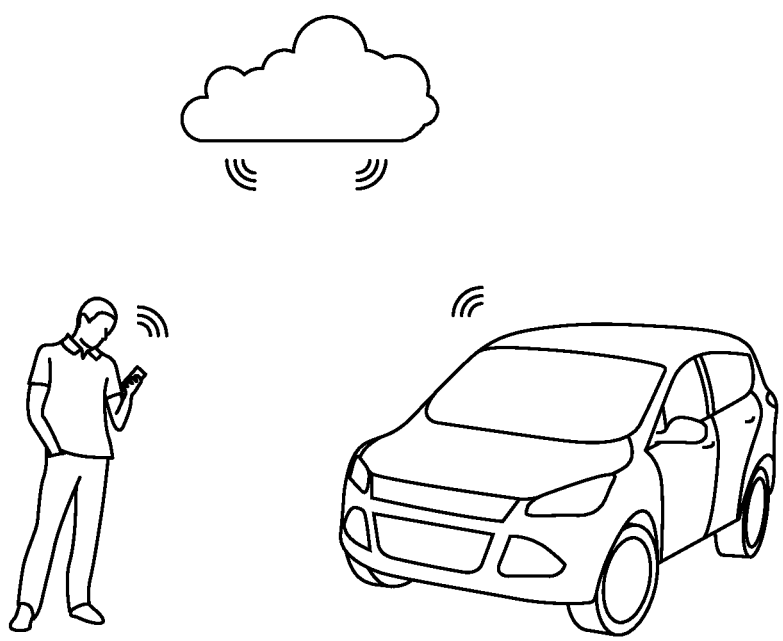
FIG. 1 is a schematic illustration of an example of an available car device system working with an application.
Figure 2:
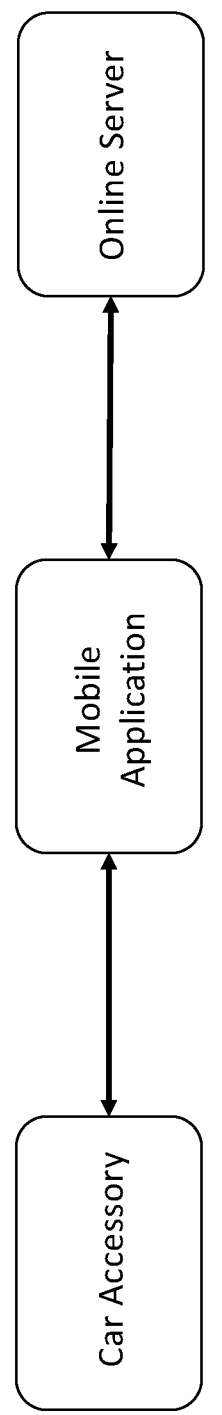
FIG. 2 is a block diagram showing an example of an available car device working with an application.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

A skin can completely change the look and feel and navigation interface of a piece of application software. Apps that are capable of having a skin applied is referred to as being skinnable, and the process of writing or applying such a skin is known as skinning. Applying a skin changes a piece of software's look and feel. While some skins merely make the program more aesthetically pleasing, others can rearrange elements of the interface, potentially making the program easier to use.

Typically, the user interface provides all end users with a single skin to the computer application. Therefore, end users see the same colour and "branding" programmed into the computer application by the computer application programmer or provider. However, a desire to customize the appearance of computer applications has emerged. From a business and marketing standpoint, original equipment manufacturers that produce certain apps using a predefined platform or a generic application want to be able to brand their particular product. Therefore, the concept of using skins to change the appearance of computer applications was developed, where a skin can be a set(s) of scripts, image and text files, and/or other media elements. These skin files are used to alter the visual appearance of apps by acting as accessories or overlays to the interface elements of the computer applications.

The present application discloses methods and system with multiple embodiments, capable of skinning an application to be used with an after-market automotive accessory or accessory. Furthermore, the present disclosure provides a method for a supplier to set up its advertisement and skin profile and push such advertisement to its target audience based on different factors such as the feedback it receives from the accessory indicating the possible services the vehicle might need, the vehicle's location and climate condition. Moreover, the present disclosure may provide statistics about the customers using the system and may possibly be used to manage marketing campaigns and loyalty programs.

In one aspect, the present disclosure provides a method for providing to users of devices, controlled by an application program running on mobile computers of the users, branding and advertising information about a supplier associated with a sale or service of the devices. The disclosed method comprises selling a number of said devices to each of a number of the suppliers or their associated agents, or service providers; providing a generic mobile computer application, or App, for using said devices as resold by the suppliers or their associated agents. The generic mobile computer application being stored on a server for download by the users and installation on the mobile computers such as a smartphone. The method further comprises determining one or more network addresses for at least one server storing the branding and advertising information about the number of said suppliers; and providing over a network in communication with the generic mobile computer application installed in said mobile computers of the users said branding and advertising information from said at least one server.

In some examples, the determining one or more network addresses of the method disclosed herein comprises storing in a database an association between an identifier of said devices and an identity of one of the suppliers, wherein the one or more network addresses is determined using said association stored in said database. In Some examples, the storing in the database the association between the identifier of said devices and the identity of one of the suppliers may comprise providing a network interface for receiving association data from said suppliers or their associated agents.

In one example of the method, the selling step may comprise storing in the database the association between the identifier of said devices and the identity of one of the suppliers. Furthermore, the selling may comprise selling to a distributor, and the storing in said database the association between the identifier of the devices and the identity of one of the suppliers comprises receiving over a computer network the identity of one of the suppliers from the distributor.

In one embodiment, the method disclosed herein comprises receiving over a data network from said generic mobile computer application the identifier of the devices, matching the identification of said devices with the suppliers in order to perform the providing over a network in communication with the generic mobile computer application installed in the mobile computers of the users the branding and advertising information from the at least one server.

In one example, the method may further comprise providing a portal interface for said suppliers to upload the branding and advertising information for storage on the at least one server.

In some embodiments, the method further comprises receiving over a data network from said generic mobile computer application data obtained about an identification of the devices also referred to as identification data, such as a serial number, and matching the identification of said devices with said suppliers in order to perform said providing over a network in communication with said generic mobile computer application installed in said mobile computers of said users said branding and advertising information from said at least one server. In one embodiment, the generic mobile computer application is configured to communicate with a predetermined address or URL. In some embodiments, in order to match the identifier with the suppliers and in order to perform said providing over a network in communication with said generic mobile computer application installed in said mobile computers of said users said branding and advertising information from said at least one server, the method further comprises providing an interface for use by said supplier to register said identifier each time that one of the devices is sold, the interface further allowing said supplier to define the branding and advertising information associating said identifier to said branding and advertising information defined by said supplier.

In some embodiments, in order to match the identifier with the suppliers and in order to perform said providing over a network in communication with said generic mobile computer application installed in said mobile computers of said users said branding and advertising information from said at least one server, the method further comprises providing an interface for use by said supplier to register said identifier on a dynamic correspondence table of device identifier to branding and advertising information content addresses each time that one of the devices is sold, searching for said identifier on a dynamic correspondence table of device identifier to branding and advertising information content addresses, providing said generic mobile computer application with a corresponding branding and advertising information address having said branding and advertising information.

I will be appreciated by those skilled in the art that the order of steps recited above is only by way of example and the method disclosed herein may be performed in any other orders as required.

In one example, after getting the device from a service provider or supplier, the user installs the App on a smartphone providing the information about the place of purchase or supplier such as the name of the supplier, which may be required from the user for allowing the installation, validating the warranty or any other reason. Based on the information entered the App receives the branding and advertising information and skin the App accordingly. In one example, the branding and advertisement information or skin and advertisement content may determine and cause the user to receive specific advertisement as may be defined by the service provider, device manufacturer or any other party controlling and setting up the branding and advertisement information.

Alternatively, in one example, the method may provide a service to the user of the device which may be an aftermarket installed automotive accessory device with a serial number or other forms of identification to a number of service providers or suppliers, dealerships or installers. In one embodiment, the present disclosure may provide an interface for use by each supplier to register the identifier each time that one of the after-market installed automotive accessory devices is installed on a vehicle. The interface may further allow the service providers to define a branding and advertising information related to the supplier for their customers. Subsequently, providing a generic mobile computing device application for using said after-market installed automotive accessory or device which is configured to receive user input related to the identifier and to communicate with a server which then provides the application with said branding and advertising information associated with one of the service providers using the user input related to said serial number.

In one example, the branding and advertising information is sent to the App based on the information provided by the user such as the name of the supplier of device while in one example, providing the application with the branding and advertising information comprises receiving by said interface said identifier sent by the generic application, searching for the branding and advertising information corresponding to the serial number, sending to said generic application said skin and advertisement content.

In a different example, providing the application with the branding and advertising information associated with one of said service providers using the user input related to said identifier further comprises searching for the identifier on a dynamic correspondence table of device serial numbers to branding and advertising information addresses, providing the generic application with a corresponding branding and advertising information address having said branding and advertising information for said application.

From what disclosed herein, it will be appreciated by those skilled in the art that, in some embodiments, allowing the service providers to define a branding and advertising information related to said vehicle sales or service center for their customers may be performed by providing the service providers with their own supplier profile to which they can log in and set up the information about the supplier branding and advertisement information such as the skin of the App or the advertisement that will be viewed by the application. In such embodiment, the profile facilitates such set up by providing an interface through which the supplier may set up their marketing campaign etc. much easier. In one embodiment, the branding and advertising information may be designed and uploaded to the interface directly without requiring a supplier profile.

In one embodiment, the device may be a car starter that works with a mobile application. The user can download a generic App from the app hosting server such as apple store and use either the supplier information, the identifier or both, for identifying and control the device using the App.

In some embodiments, a supplier can register the identifier under a corresponding supplier profile which may have a branding and advertising information. Subsequently, the generic application will be skinned using the branding and advertising information of the supplier profile upon the user initiating the application. The application may also receive advertisement and messages in addition to the skin setting through the skin and advertisement content.

In some embodiments, the supplier does not need to register each device sold and the information provided by the user such as the supplier name would determine the branding and advertising information which will be sent to the App.

In some embodiments, the device may need to be registered and/or an initiation may be required before the App can be used to control the device. In one such example, the interface for registering the device, the dealer profile, and the branding and advertising information are located on the same server. Alternatively, in some embodiments, the interface for registering the device and the dealer profile may be found in separate servers or locations.

For example, when a user installs the generic App and connects to the interface to initiate the application, the interface asks for the identifier of device, and if such identifier is registered in accordance to a supplier profile, either within the service profile or in the correspondence table, it sends the application to the supplier profile which may be the supplier server, website etc. If the identifier is not registered with any supplier, the interface may either allow the application to continue with a generic skin or push its own skinning or advertisement or alternatively does not allow the application to be active as a safety measure.

In one embodiment, the user may connect to the device and collect the identifier before using them for initiating the App.

The present disclosure further provides a system for providing a user with branding and advertising information about a supplier, the system comprising a device having a transceiver, a mobile computer for use with a generic application to control said device, a first server for providing said user with said generic application; and one or more network addresses for at least one server storing said branding and advertising information of said supplier and providing said mobile computer with said branding and advertising information.

In some embodiments, the system may further comprise an interface to register the identifier in connection to a supplier profile which may be used to identify the device and associating it with a supplier profile, therefore, providing the corresponding branding and advertising information accordingly.

In some embodiments, in order to register the identifier or the serial number, a supplier has to log into the supplier profile and register the identifier in accordance to that specific profile. In one example, a user enters the identifier into the generic application and the system upon connecting to the interface recognizes the profile to which the identifier belongs and pushes the skinning and advertisement content of that specific profile.

In one alternative embodiment, the interface is only used to register the identifier in a table of device identifier to supplier profile addresses or branding and advertising information content addresses. When a user enters the identifier into the generic application the interface provides the generic application with information regarding the supplier profile and/or redirects the application to the supplier profile address.

It will be appreciated by those skilled in the art that the supplier profile may collocate with the interface or registration source on the same server or may be located on a completely independent server that may be hosted by the service provider.

In some embodiments, the identifier may be a serial number of the device. Nevertheless, any other identification indicator or data may be used in place or in combination with the identifier to provide further security to the device. An example of such devices is a remote car starter which allows an end user to start a car using an application on a cell phone.

In some embodiments, the system provides a supplier with the ability to send an advertisement to an end user's application through the supplier profile. This allows the supplier to target it's promotions and advertisements more accurately.

In some examples, the system disclosed herein uses one or both of the interface and the supplier profile to communicate and control the device while the application may also control the device independently or in combination by the interface and/or the supplier profile.

In some embodiments, the system may only connect to the interface only at an initiation to activate the application and receive the kin and advertisement content while in some alternative embodiments, the application may need to connect to the interface before it can be used to control the device. In one alternative embodiment, the application requires the initial connection to be activated but may connect the supplier profile frequently to update the branding and advertising information of the application.

In one embodiment, the car device may be a remote starter which works with an application that may be installed on a user cell phone or any other end device. To use the starter, the application has to be initiated using the identifier of the accessory. This setting requires the user to open up the application every time the car starter is being, therefore, providing more effective exposure to the skinning and the advertisement.

Upon initiation, the Application connects to the interface which may be the remote starter manufacturer's server to find the supplier profile corresponding to the serial number. Next, the application goes to the supplier profile to download the skin and advertisement profile assigned to said serial number. The supplier profile may be found on a different server such as the dealership or supplier server, or it may be a profile on the manufacturer's server assigned to that specific dealership. The later provides the manufacturer with the ability to provide the service providers and dealership with hosting services on an ongoing basis. In addition to the financial benefits of creating ongoing revenue for the manufacturer, this would be very desirable for smaller service providers that cannot host their own service profile.

In some embodiments, the first owner that initiates the application is recognized by the system as the owner of the device and any additional user may need a license or a key number from the owner to use the device through the application.

Furthermore, in some embodiment, the supplier or the owner may transfer the owner to another user using an application generated mechanism, through the interface or through the supplier profile.

In some embodiments, instead of having a dealer register the identifier on the interface, the manufacturers may provide car accessories and devices to dealerships and register the identifier of each device on a dynamic correspondence table of the device serial numbers to supplier profiles which belong to the specific dealership selling the accessory.

In some embodiments, the supplier can own and manage their supplier profile or they may use the manufacturer's platform to design and manage their supplier profile.

In some embodiment, the disclosed system provides an identifier which is registered under the name of a dealership, the application user may receive only promotions and advertisements chosen by that dealership. In one embodiment, the supplier can later transfer rights in the device and advertisement on the application platform to another supplier or charge another supplier to advertise their products on their behalf.

Figure 3A:
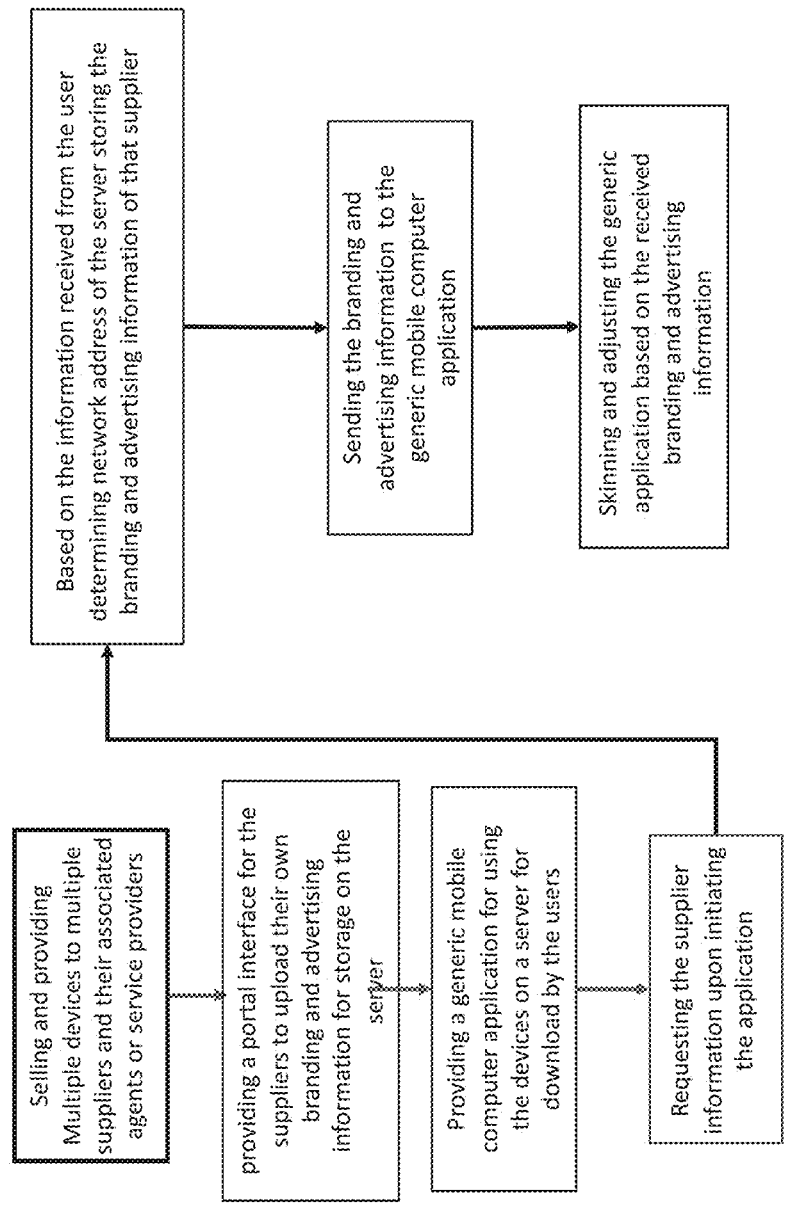
FIG. 3A illustrates a flowchart of the steps taken in accordance with one example of the method disclosed wherein user provided information is used to recognize the supplier providing the device.

Referring to FIG. 3A, an example of the disclosed method is provided wherein the manufacturer sells or provides the devices to multiple suppliers and provides the suppliers with a portal interface for them to upload their branding and advertisement information. Also, the generic mobile App for using the devices is provided to the users for download through app stores, URL links or any other method known in the art. When a user downloads the App and wants to use it, the App asks for information regarding the supplier such as name, address, date of purchase or any other information. This information may be collected as a part of the warranty registration, App activation required for using the App, on a voluntary basis by the user or any other reasons. The information provided is further used to determine which address the branding and advertising information have to be downloaded. This can be one or more online addresses based on one or more servers. After determining the source, the branding and advertising information is provided over a network to the generic App which can be used for skinning the App, pushing advertisement or any other content through the application as disclosed herein.

Figure 3B:
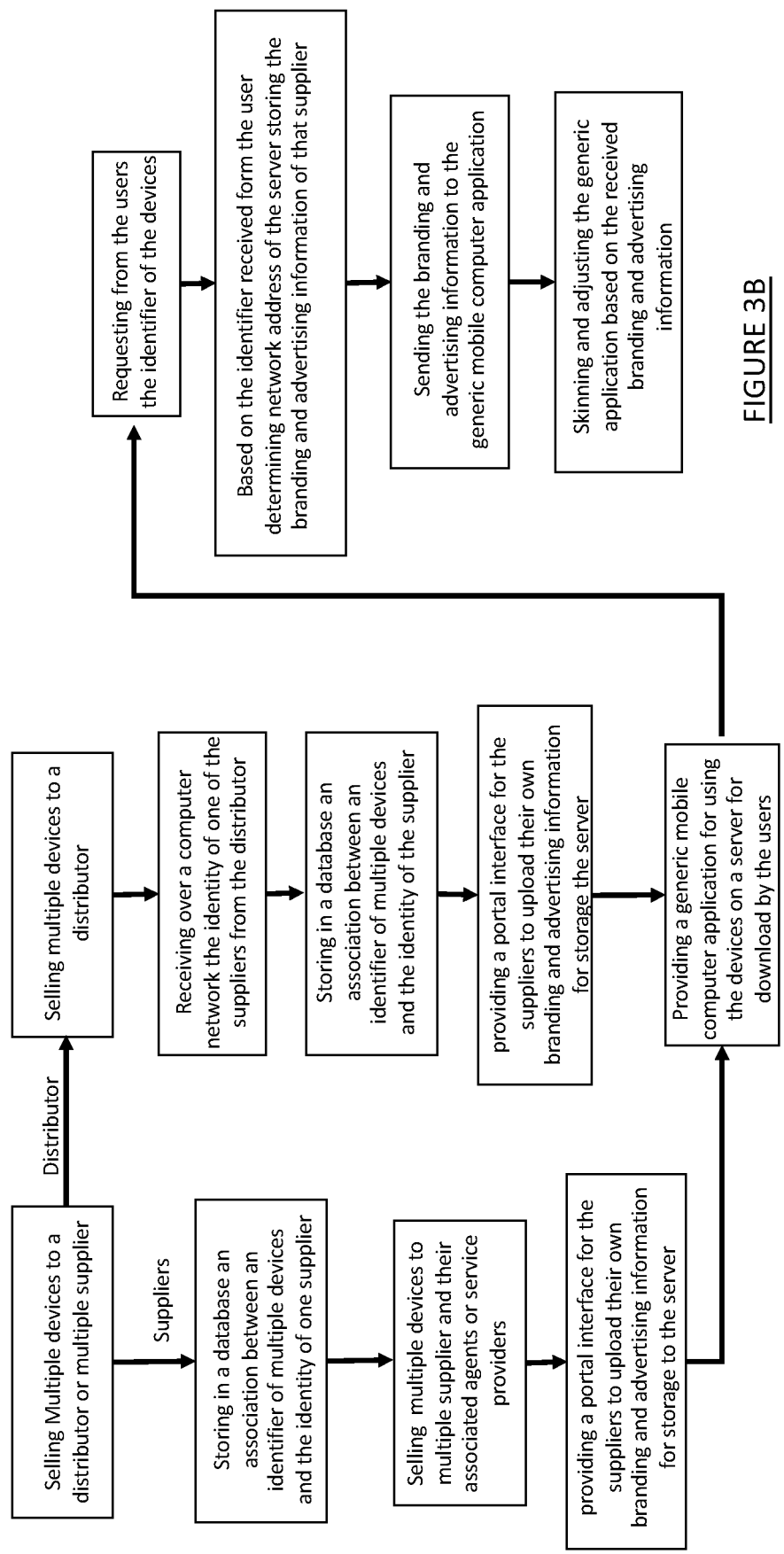
FIG. 3B illustrates a flowchart of the steps taken in accordance to one example of the methods disclosed wherein an identifier is used to recognize the supplier providing the device in two different scenarios of sale to a distributor and multiple suppliers.

Referring to FIG. 3B, an example of the disclosed method is provided wherein the manufacturer sells or provides the devices to either multiple suppliers or a distributor which further provides the suppliers with the devices.

In the former scenario, the manufacturer may store in a database an association between an identifier of multiple devices and the identity of one supplier before selling the devices to multiple supplier and their associated agents or service providers and only provide them with providing a portal interface to upload their own branding and advertising information for storage to the server. This registration may also be done by the suppliers themselves details of which is disclosed in this application.

In the latter scenario, the manufacturer may receive over a computer network the identity of one of the suppliers from the distributor and use the information received to store Storing in the database an association between an identifier of multiple devices and the identity of the supplier and only provide them with providing a portal interface to upload their own branding and advertising information for storage to the server. This registration may also be done by the suppliers themselves details of which is disclosed in this application.

Subsequently, the users are provided with the generic mobile App for using the devices through the App Store, Play store, URL links or any other method known in the art. When a user downloads the App and wants to use it, the App asks for the identifier of the device. This information may be requested for activation of the application without which application cannot be used or as an option or any other reasons. Based on the identifier received from the user, the network address of the server storing the branding and advertising information of that supplier is determined. This can be one or more online addresses based on one or more servers. After determining the source, the branding and advertising information is provided over a network to the generic App which can be used for skinning the App, pushing advertisement or any other content through the application as disclosed herein.

Figure 4A:
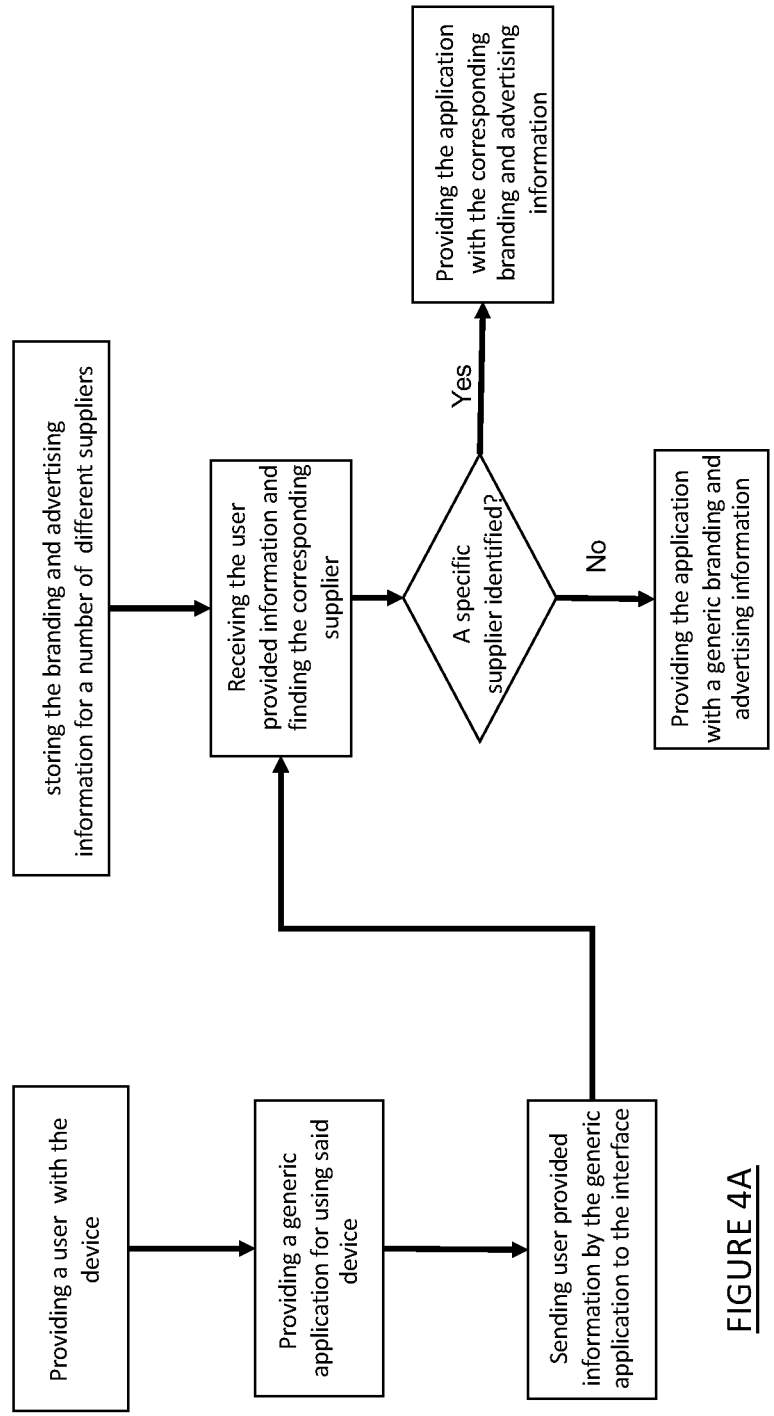
FIG. 4A illustrates a flowchart of the steps taken in accordance with one example of the methods disclosed wherein user provided information is used to recognize the supplier providing the device.

As illustrated in FIG. 4A, in some embodiments, a user purchases a device that works with a mobile application from a supplier. The user can download a generic application from an address provided or an App hosting server such as apple store or play store. Subsequently, the user may enter some information such as the supplier name to initiate the application and receive the supplier's corresponding branding and advertising information.

Alternatively, the user may be asked to enter an identifier such as the serial number of the device which is used for identifying the device and to receive the branding and advertising information of the supplier in accordance to which the device identifier has been registered. This registration, as disclosed herein, may be done by the manufacturer or by the supplier and its agent.

In one embodiment, there is no need for the user to enter the information and the application is able to connect to the device using wired or wireless connection and obtain the identification information.

Figure 4B:
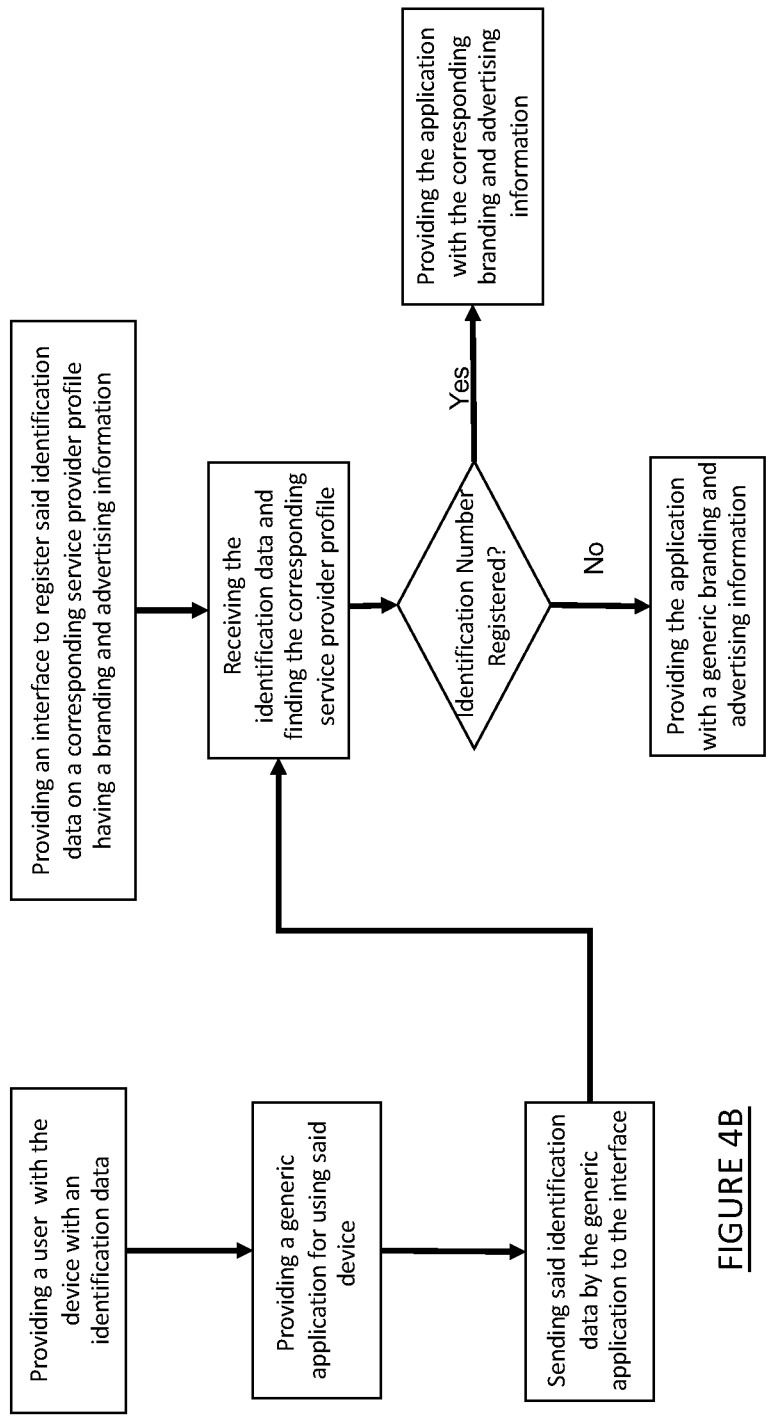
FIG. 4B illustrates a flowchart of the steps taken in accordance with one example of the methods disclosed wherein an identifier is used to recognize the supplier providing the device.

As illustrated in FIG. 4B, in some embodiments, a service provider, using an interface, can register the identifier of the device in accordance with a corresponding supplier profile and set up a corresponding branding and advertising information. In this embodiment, the generic application will be skinned using the branding and advertising information provided upon the user entering the identification number of the device.

In one example, the user enters the identifier in the generic app which connects to the interface and searches for the identifier within different supplier profiles. If the identifier is registered, the interface will send to the application the branding and advertising information of the corresponding supplier which will be subsequently used by the App to skin the generic application.

The application may also receive advertisement and messages based on the branding and advertising information it receives.

In one embodiment, If the identifier is not found on the interface, the application may receive a generic skin and advertisement content, a message stating that the device is not registered and cannot be used before registration, an activation message without requiring registration or other possible messages.

In another embodiment, as shown in FIG. 4C, the present disclosure provides a method for customizing a mobile application that controls a device which comprises providing a device which has identification data, providing a generic application for use with the vehicular device, providing an interface to register the identifier in a dynamic correspondence table of device identifier to branding and advertising information content address, providing said generic application with a corresponding branding and advertising information content address.

In one example, in order to provide the application with the branding and advertising information, the method further comprises receiving by the interface the identifier sent by the generic application, searching on the dynamic correspondence table for a corresponding supplier profile address to the identification data, redirecting said generic application to the corresponding supplier profile address, sending the branding and advertising information from said corresponding supplier profile address to said generic application.

It will be appreciated by those skilled in the art that the corresponding branding and advertising information content address may refer to an address having the corresponding branding and advertising information or to an address having the supplier profile or website which contains the branding and advertising information content.

For example, when a user installs the generic application and connects to the server, the server asks for the identifier of the device, and if such identifier is registered in accordance with a supplier profile address or a branding and advertising information address, it redirects the application to said profile which may be the supplier server, website etc. If the identifier is not registered with any service provider, the interface may either allow the application to continue with a generic skin or push its own skinning or advertisement package or alternatively does not allow the application to be active as a safety measure.

Figure 5:
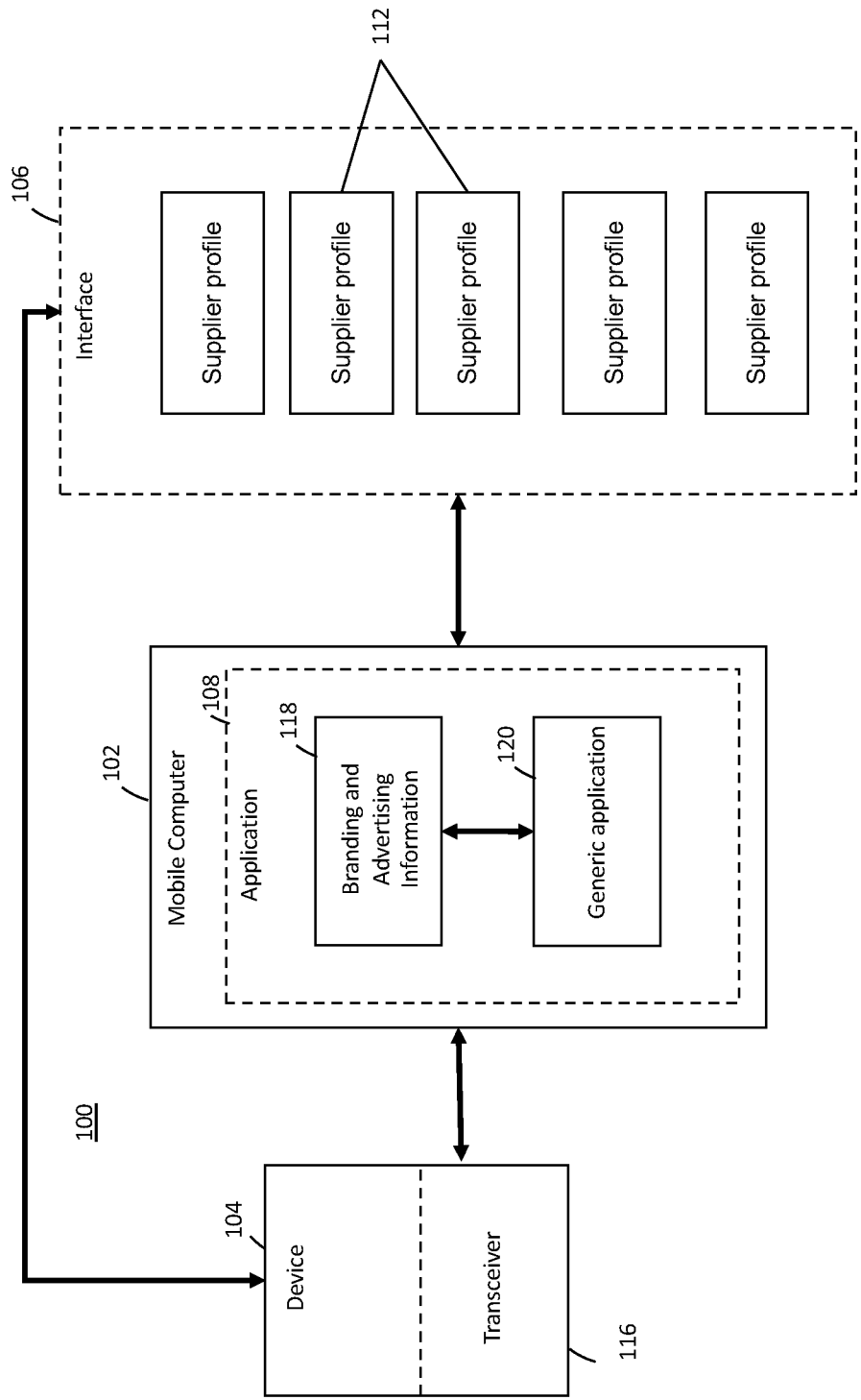
FIG. 5 is a block diagram illustrating the system in accordance to one embodiment of the present invention wherein the identifier is registered on a supplier profile which is integrated into the interface.

Referring to FIG. 5, the system 100 comprises a device 104 having a transceiver 116, a mobile computer or computing device 102 for use with an application 108 to control the device 104, a first server (not shown here) for providing said user with a generic application 120 and interface 106 having supplier profiles 112 which provides the application 108 with a branding and advertising information 118. As illustrated the application 108 has the generic application 120 which can be downloaded from a server and a branding and advertising information 118 which is provided to the mobile computer 102 by the interface 106.

In some embodiments, in order to register the identifier of a device, a supplier has to log into the supplier profile 112 and register the identifier on it.

In one example, the user enters the identifier into the generic application 120 and the system upon connecting to the interface 106 recognizes the supplier profile to which the identifier belongs and sends the skinning and advertisement content 118 to the application 108 accordingly.

Figure 6:
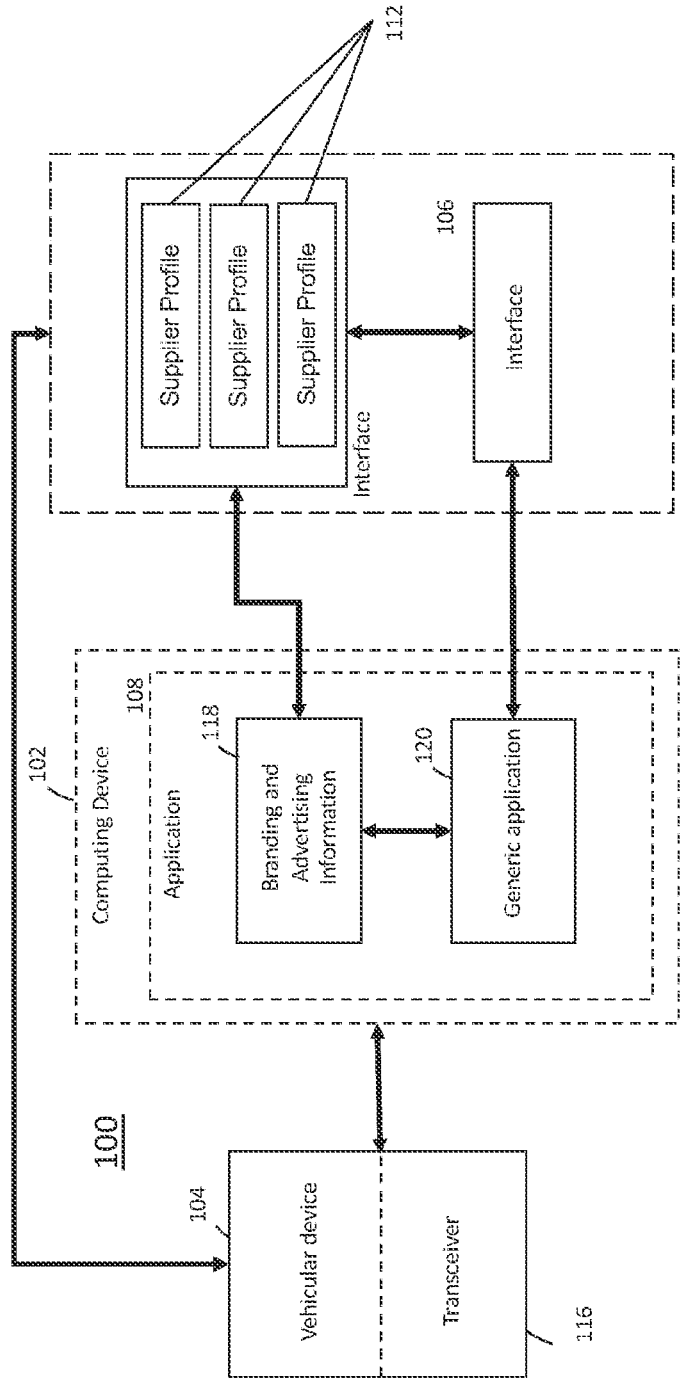
FIG. 6 is a block diagram illustrating the system in accordance with one embodiment of the present invention wherein the identifier is registered on the supplier profile which communicates with the interface.

In some embodiments, the interface 106 and the supplier profiles 112 may be located on the same server. As illustrated in FIG. 6, in some embodiments, the interface 106 for registering the serial numbers and the dealer profile are separate elements that may be found on separate servers and/or address.

It will be apricated by those skilled in the art that "identification data" as referred to herein may, in addition to the device part serial number, refer to any other identification indicator in place or in combination with the identifier to provide further security to the device. Some examples may be the car VIN number, a user ID and password set up by the supplier for the user, a telephone number assigned to the specific device using the interface, the MAC address of the smartphone of the owner registered on the interface, or even general information about and etc.

In some embodiments, the system provides a supplier with the ability to send advertisements to an end user's application through the supplier profile and the skin and advertisement module. Hence, allowing the supplier to target it's promotions and advertisements to its clients more accurately.

In some examples, the system disclosed herein uses one or both of the interface and the supplier profile to communicate and control the vehicular device.

In alternative embodiments, the application may control the device independently or in combination by the interface and/or the supplier profile.

In some embodiments, the system may only connect to the interface only at the initiation and to activate the application and receive the branding and advertising information 118 while in some alternative embodiments, the application may need to connect to the interface before it can be used to control the device.

In one alternative embodiment, the application needs the initial connection to be activated but may also connect the supplier profile frequently only to update the branding and advertising information 118 of the application.

In one embodiment, the device 104 may be a remote car starter which works with the application 108 that may be installed on a user cell phone or any other end device. Such devices provide better exposure to the advertised content for the supplier since the user has to use the application every time he wants to use the application.

To use the starter, the application 108 has to be initiated using the identifier of the car starter. After initiation, the application 108 connects to the interface 106, which may be the provided by the remote car starter manufacturer to find the supplier profile corresponding to the identification data. As disclosed herein, in some embodiment the interface 106 may have a number of supplier profiles 112 integrated within it or work in connection with the interface.

Figure 7:
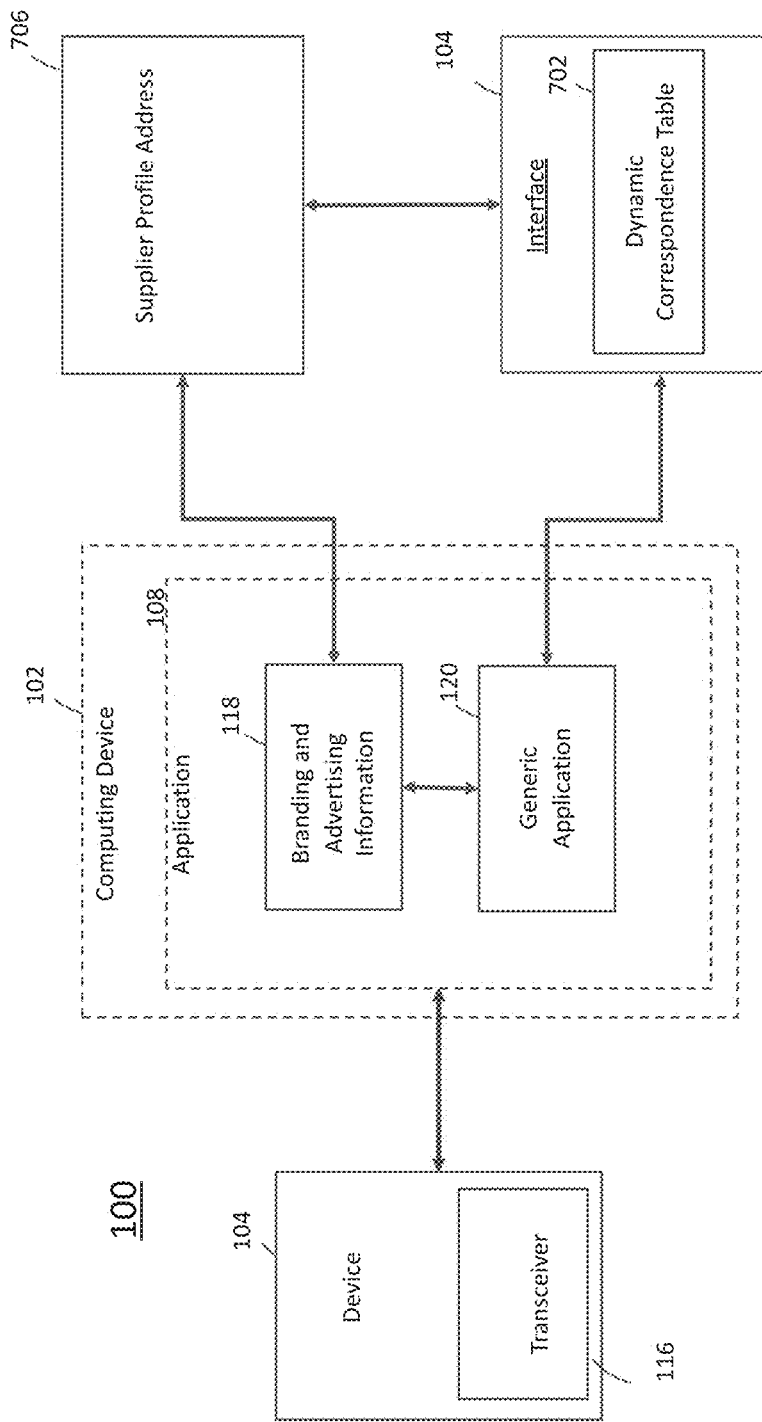
FIG. 7 is a block diagram illustrating the system in accordance to one embodiment of the present invention wherein the identifier is registered on the dynamic correspondence table of the interface providing the application with the supplier profile address located on a separate server.

As illustrated in FIG. 7, in some alternative embodiments, the interface 106 may have the dynamic correspondence table 702 which provides the application 108 with an address of the supplier profile 112. It will be appreciated by those skilled in the art that even in the latter embodiment, the supplier profile 112 and the interface 106 do not necessarily have to be located on different servers. Subsequently, the application 108 goes to the supplier profile to download the branding and advertisement information 118 assigned to said identification data. The application 108 then receives the skin and advertisement profile 118 from the supplier profile 112. The application 108 then uses the branding and advertising information 118 for skinning the application 108.

In some embodiments, the first user that initiates the application 108 is recognized by the system 100 as the owner of the device 104 and any additional user may need an activation code or permission from the owner to use the device 104.

In one embodiment, the supplier or the owner may transfer the ownership of the device to another user using the application 108, through the interface 106, through a user interface 1012 or through the supplier profile 112.

In some embodiments, instead of having the supplier to register the identifier on the interface 106, the manufacturers may provide the device 104 to dealerships and register the identifier of the device on the dynamic correspondence table 702 or on the supplier profile 112 supplier profile which belongs to the specific supplier or dealership selling the device/accessory.

The supplier may own, host and manage its profile directly or use the manufacturer's platform for hosting and to design and manage its profile. In this manner, if the identifier is registered under name of dealership X, the application user may receive promotions and advertisements chosen by dealership X.

In some embodiment, the manufacturer or the supplier can advertise other products and services on the application 108.

In one embodiment, the supplier can later transfer its rights in the device and advertisement on the application platform to another service provider. This transfer may be done through the supplier profile or the application.

In one embodiment, when a new supplier registers an identifier that has been previously registered under a supplier profile, a message will be sent to the first supplier to seek permission and/or notify the first service provider. The system may ask for permission to transfer the identifier to the second supplier profile before transferring or alternatively transfer the identifier unless it receives opposition from the first service provider.

Referring to FIG. 6 shows an alternative embodiment of the system 100 in which the interface 106 and the supplier profile 112, despite being located on the same platform are separate modules. In this embodiment, the supplier logs into its account and registers the serial number. The system 100 then transfers the registration information to the interface 106 which is subsequently used as the platform for initiating the application 108. Furthermore, this setting may allow the device manufacturer to implement further security features or content through the interface 106 only for the benefit of the end user without allowing the supplier to have access to these features. This allows the device to have an added layer of security.

Referring to FIG. 7, in one embodiment, the interface 106 may be used to register the identifier in a correspondence table 702 of device identifier to dealer profile addresses. When a user enters the identifier into the generic application 120, the application sends this information to the interface 106 which searches in the correspondence table 702. If the identifier is registered, the interface provides the generic application with the corresponding branding and advertisement information or the supplier profile address 112 and/or redirects the application 108 to the supplier profile address 706.

Figure 8:
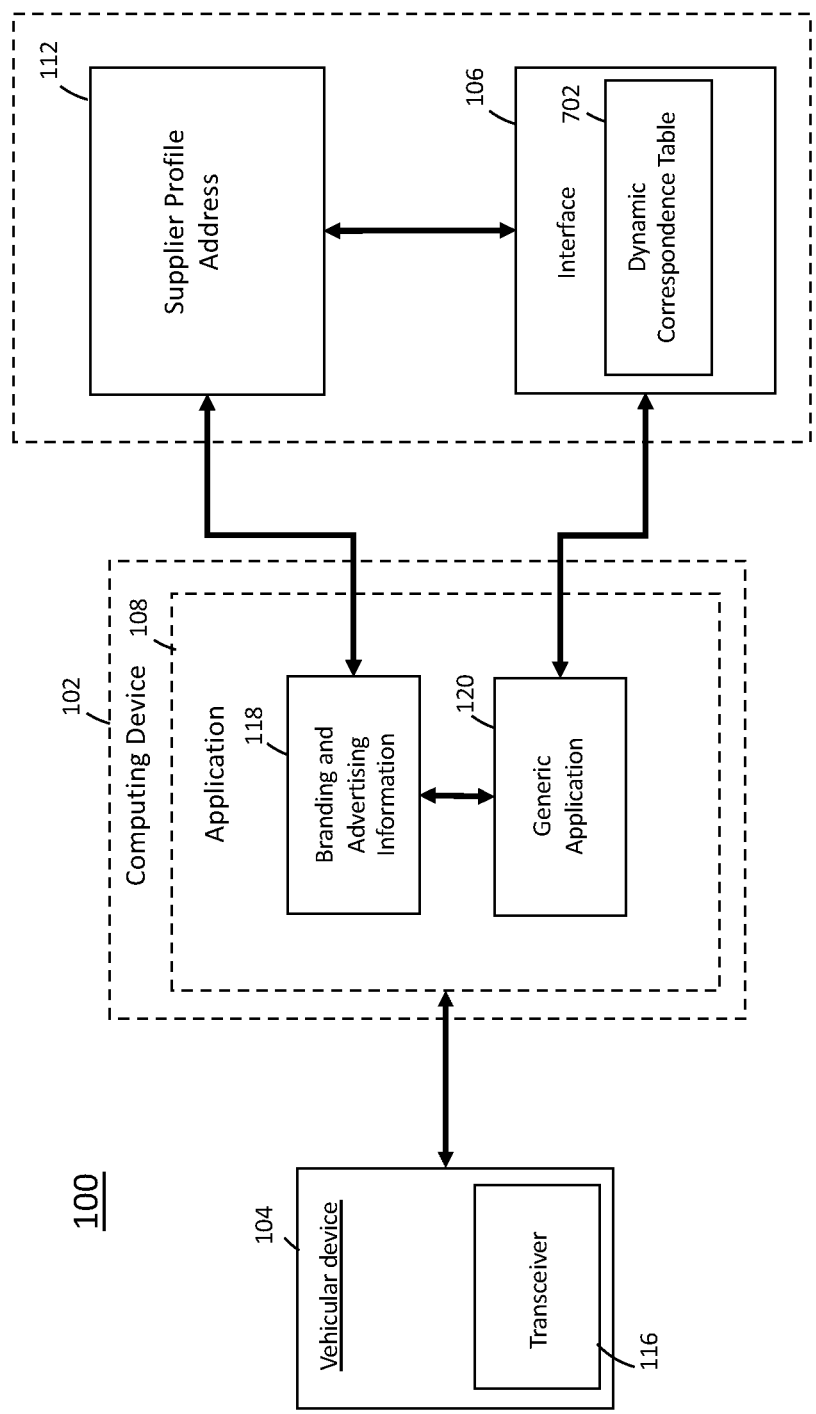
FIG. 8 is a block diagram illustrating the system in accordance to one embodiment of the present invention wherein the identifier is registered on the dynamic correspondence table of the interface providing the application with the supplier profile address located on the same separate server.

It will be appreciated by those skilled in the art that the supplier profile 106 may collocate with the interface 106 on the same server, as illustrated in FIG. 8, or may be located on a completely independent server, shown in FIG. 7, that may be hosted by the service provider.

FIG. 8 illustrates an embodiment in which the device 104 has a transceiver 116 that can only connect to the computing device 102 via a wireless connection and cannot communicate with the interface or the supplier profile directly.

Figure 9:
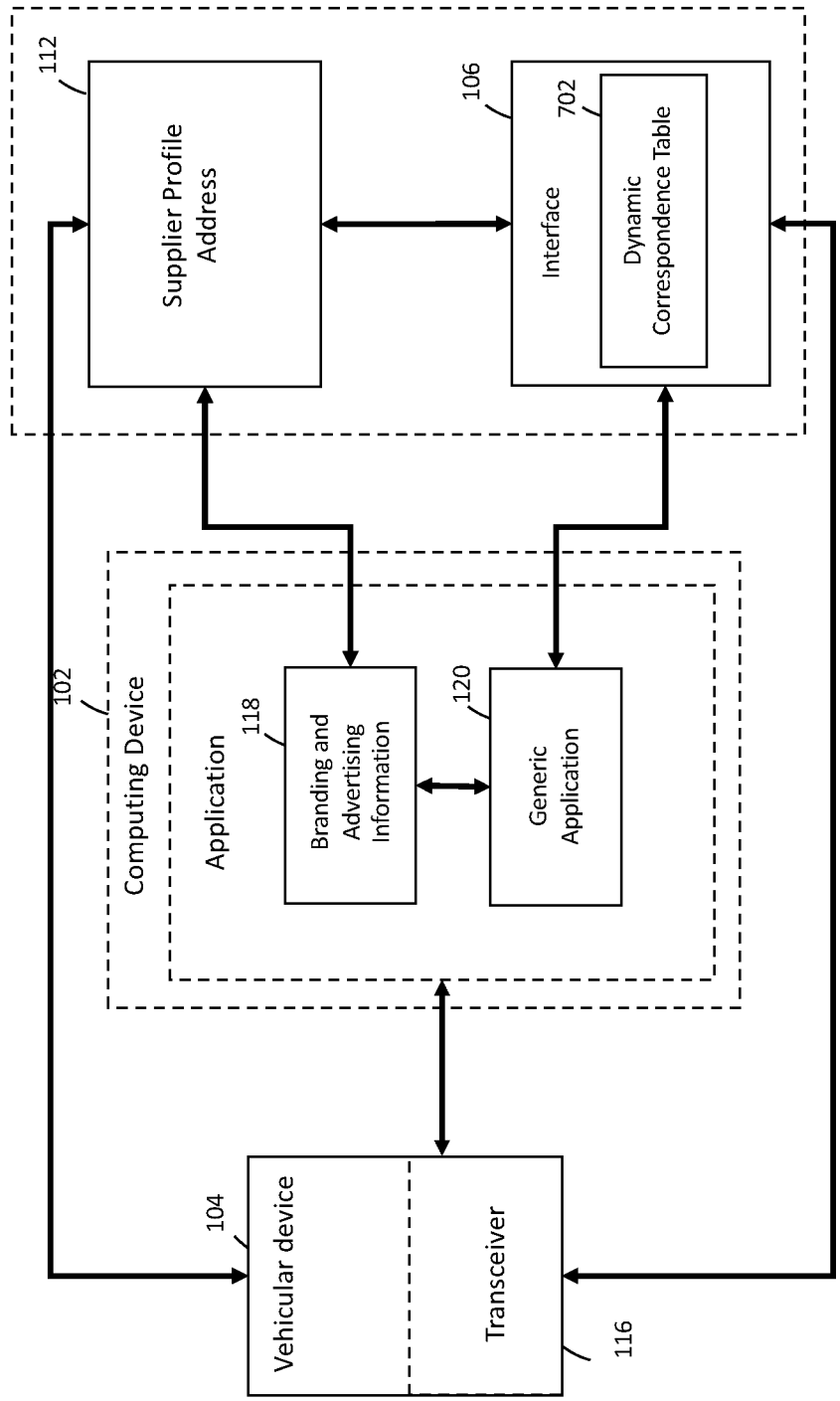
FIG. 9 is a block diagram illustrating the system in accordance with one embodiment of the present invention wherein the supplier profile and the interface can communicate directly with the vehicular device/accessory.

As illustrated in FIG. 9, in some aspects, the system 100 uses one or both of the interface 106 and the service profile address 112 to communicate and control the device 104. In one example the application 108 needs to connect to the supplier profile and/or the interface every time it's being used to confirm, update or authorize use while in other examples, after initiation, the application may connect directly to the device via a wireless connection without requiring to connect to any of the online sources.

In one embodiment, the car device may be a remote starter which works with an application that may be installed on a user cell phone or any other end device. To use the starter, the application has to be initiated using the identifier of the accessory. Upon initiation, the application connects to the interface 106 which may be the remote starter manufacturer's server to find the supplier profile address 112 assigned to the serial number. Then the application goes to the supplier profile address 112 to download the skin and advertisement profile 118 assigned to said serial number. The secondary online address any be a different independent server such as the dealership that sold the remote car starter server or it may be a profile on the manufacturer's server assigned to that specific dealership.

After initiating the application 108, the user can use the application which was skinned using the branding and advertising information 118 to start the vehicle remotely. Such method of use requires the user to open the application which results in the user's exposure to the advertisement as desired by the service provider.

Furthermore, in some embodiments, the car starter or any other device benefiting from the disclosed technology, may transfer back information from the vehicle to the supplier profile regarding the maintenance requirements of the vehicle which allows the system 100 to send appropriate advertisements to the application accordingly.

Figure 10:
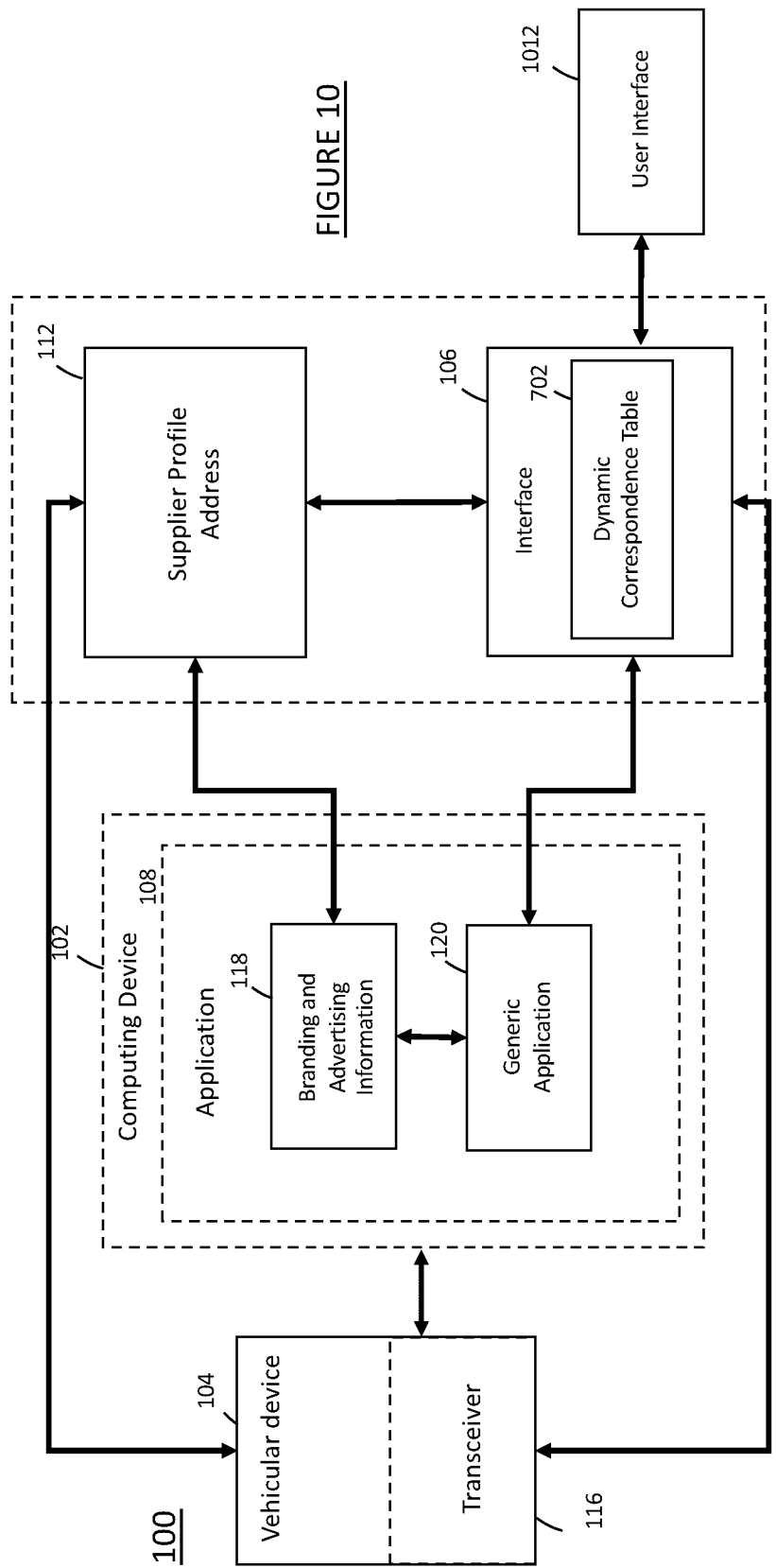
FIG. 10 is a block diagram illustrating the system in accordance with one embodiment of the present invention wherein the system has a user interface.

Referring to FIG. 10, it shows an embodiment having a user interface 1012 which allows a user to connect to the interface 106 and receive information regarding the vehicle such as the physical location and maintenance status and make changes to the setting, authorize users, transfer ownership and book maintenance appointments. The system 100 may allow the user interface 1012 to communicate directly with the supplier profile 112 or through the interface 106 to book appointments.

In some embodiments, the features of the user interface 1012 are available through the application 108 and the user can book appointments and receive information easily through the application.

Figure 11:
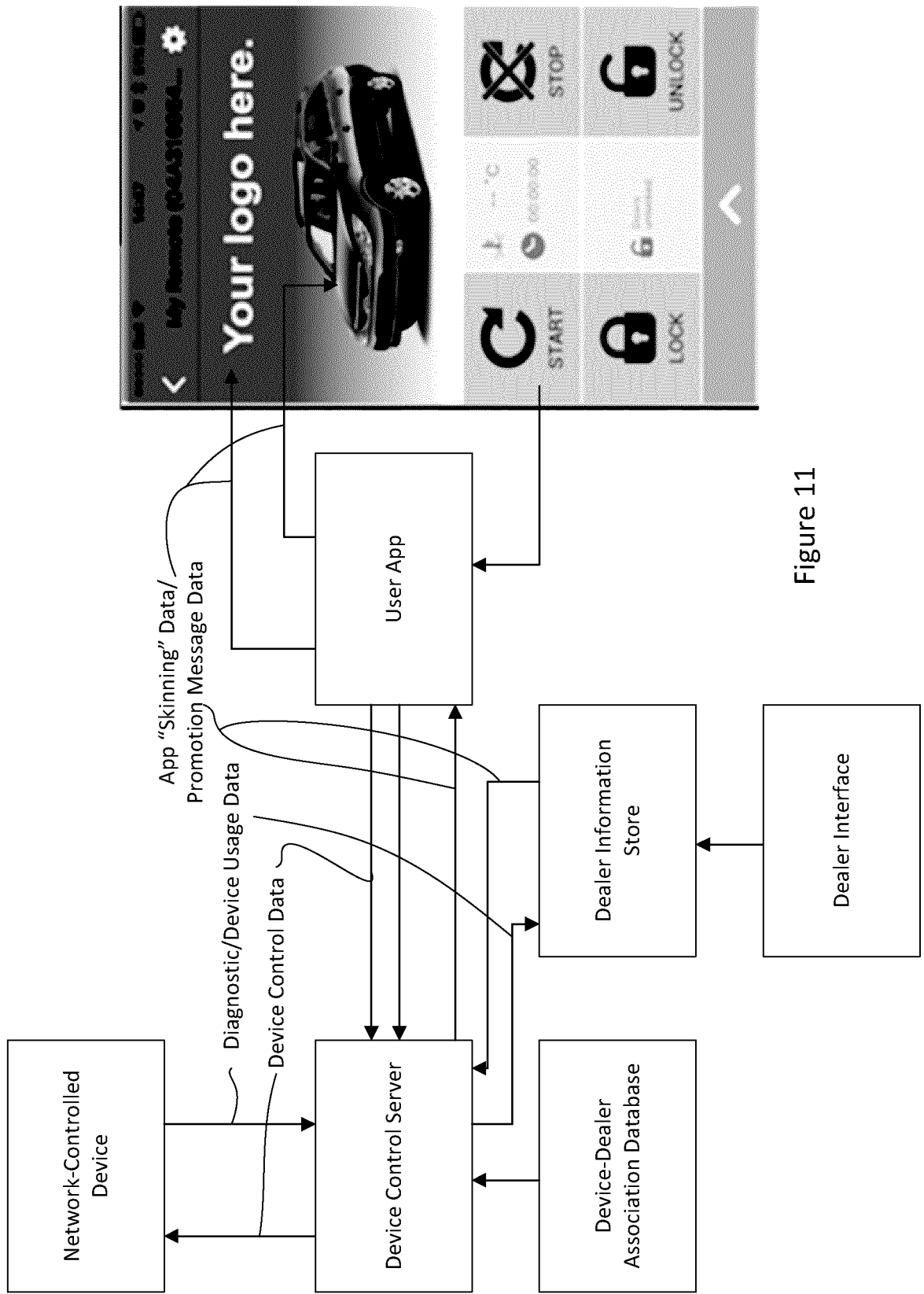
FIG. 11 shows schematically components of an embodiment.
Figure 12:
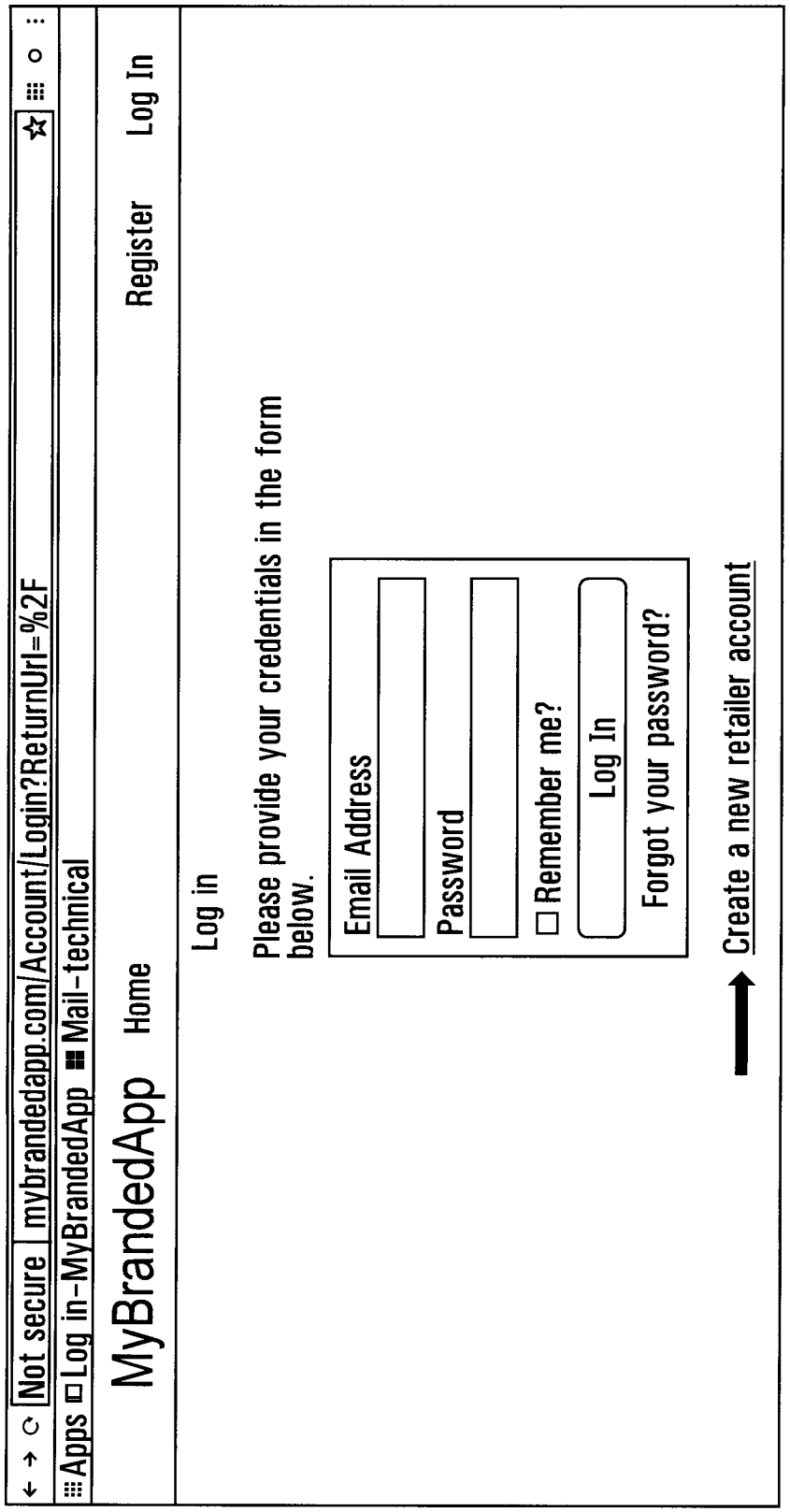
FIG. 12 is a screenshot showing the dealer log-in page of the dealer interface in accordance with one embodiment of the present invitation.

FIG. 11 shows schematically components of an embodiment. As will be appreciated, the components illustrated can comprise a combination of a processor and at least one memory containing program code or instructions that allow the processor and related hardware to provide the components as described herein.

The Network-Controlled Device can be for example a remote vehicle starter installed in a vehicle. Other examples can be an entertainment system, a security system, exercise equipment or household appliances. The diagnostic data can comprise any feedback in response to the device control data or other device diagnostic or usage data.

In the case of a remote vehicle starter that is connected into the vehicle's data bus, the diagnostic data can include vehicle computer diagnostic data in addition to the state of components, such as the operating state of heating or air conditioning, door locks, etc.

The User App can run on any suitable computing platform, such as a personal computer, tablet or smartphone. As schematically illustrated, the user App interface screen can comprise controls for the user to control device features.

In the example of a vehicle starter illustrated, the controls can be to start and to stop the vehicle ignition, to lock and to unlock the vehicle doors. Data such as interior and exterior temperature and the state of the door locks can be displayed. The user interface also provides room for dealer promotional information and/or messages as well as the possibility to brand the app and to customize the app for the client. For example, the app's color themes, the dealer's logo, the model and color of the vehicle displayed can be customized. In addition to, or as an alternative, the promotional information can be presented full screen and the user can interact or wait for the display to change to the device control interface.

In one embodiment where in the device is a remote starter, the diagnostic data can be transmitted from the vehicle to the device control server for relaying to (or directly to) the dealer or supplier server (as illustrated in FIG. 11, this is labelled as the Dealer Information Store), and in response to vehicle computer codes related to vehicle-specific maintenance needs, messages can be sent to the User App to invite the user to arrange for vehicle service.

The Dealer Interface allows for the Dealer or supplier to change and update the promotional message data for all users or for groups of users or for individual users.

When a device is initially put into service, it may be factory-configured to connect to the Device Control Server, rather than requiring programming or configuration in the field to do so.

Likewise, the User App can be a generic app that is not associated with any specific dealer, and the User App can receive its branding from the Device Control Server/Dealer Information Store. Alternatively, it is possible to allow the user to select a branding for the app from the settings available in the app.

In some embodiments, the Device Control Server or the interface 106 may comprise a Device-Dealer Association Database or supplier profile address 112 as illustrated in FIG. 11. In some embodiments, the User App is configured to request that a user input a code or an identifier associated with the Network-Controlled Device. Such a code can be directly a network identifier of the device (e.g. a MAC address), or it can be a code that associates a network identifier in the database of the Device Control Server. When a user inputs the code, the Device Control Server then checks in the Database what dealer is associated with the device. If the dealer has not used the Dealer Interface yet to claim an association with the device by the given code, the Device Control Server can then either allow the device to be used in a generic mode, or, in particular in the case where the dealer is sponsoring the cost of the device control service, it can block control of the device until the dealer claims the device.

The Dealer Interface can allow a dealer to securely log in, and provide essential information about the dealer, such as address, contact information, hours of business, logo images and/or text, etc. The Dealer Interface can comprise an API so as to interface with a CRM system of the dealer.

FIGS. 12 to 17 show screenshots from different steps of registering a user profile on a user profile interface in accordance with one embodiment of the present application including: the dealer log-in page of the dealer profile interface, the dealer account creating page of the dealer profile interface, the adding contact information page of the dealer profile interface, the defining opening hours page of the dealer profile interface and the defining user information page of the dealer profile interface.

Figure 18:
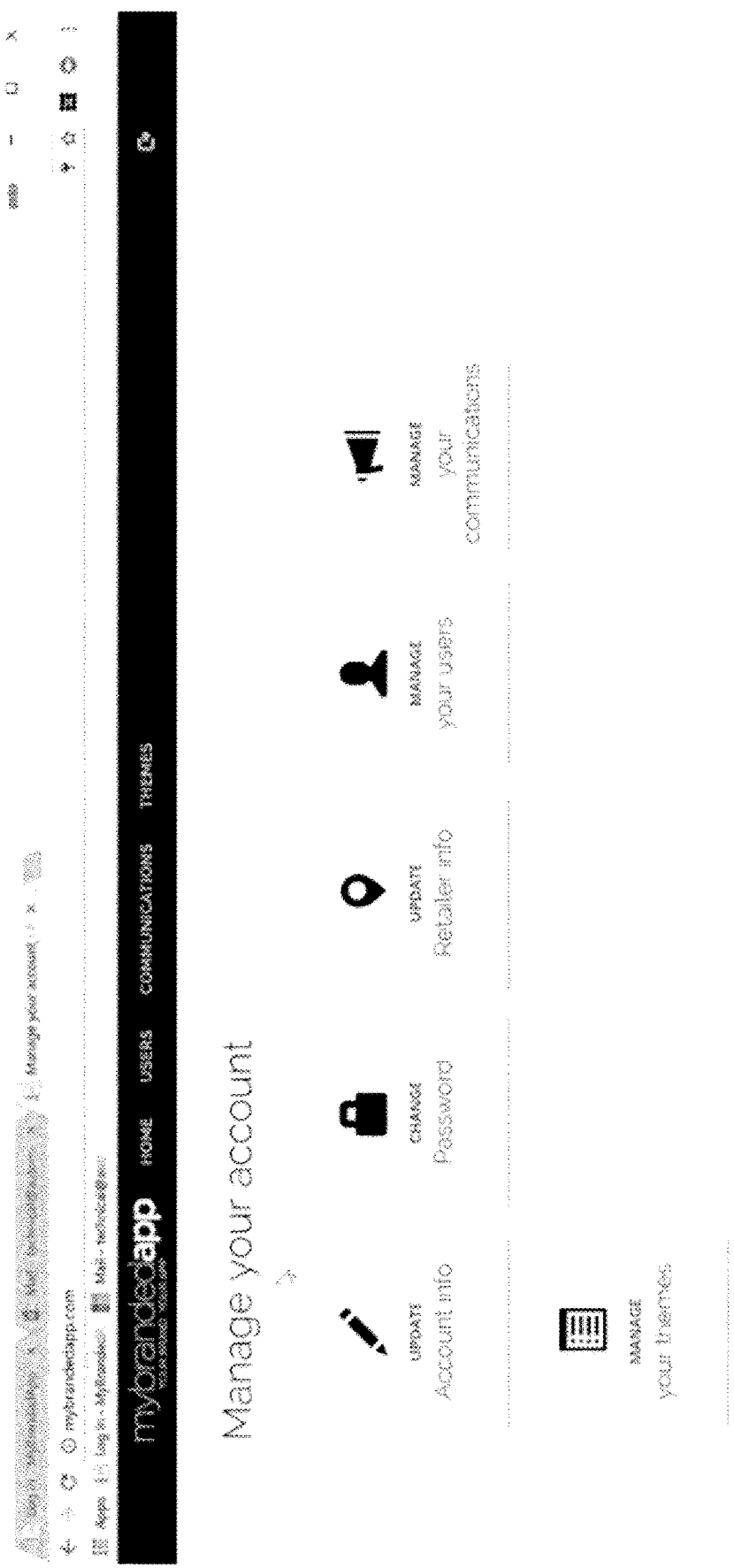
FIG. 18 is a screenshot showing the dealer interface after account creation and validation in accordance with one embodiment of the present invitation.
Figure 19:
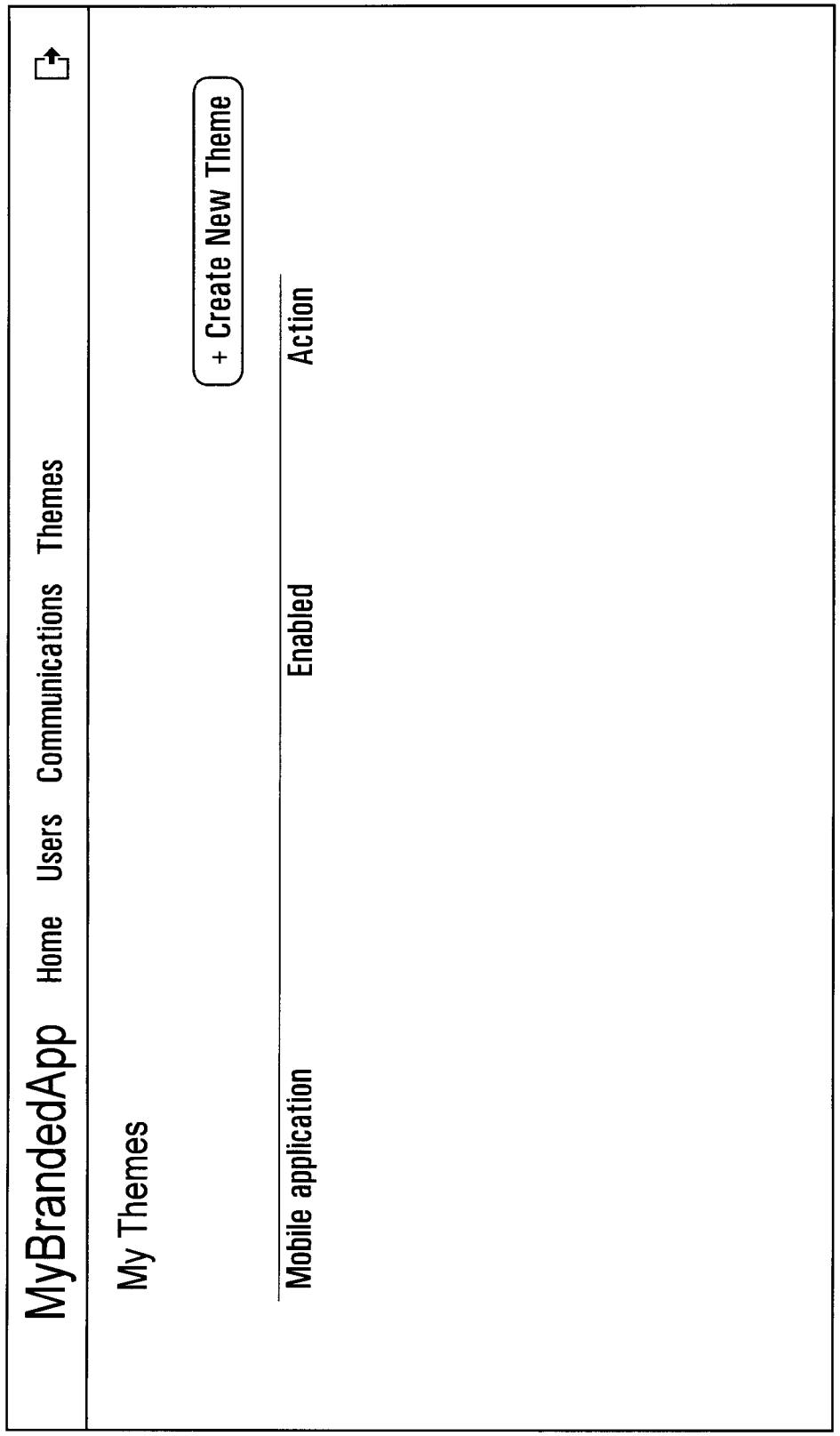
FIG. 19 is a screenshot showing the create new theme page of the dealer interface in accordance with one embodiment of the present invitation.
Figure 20:
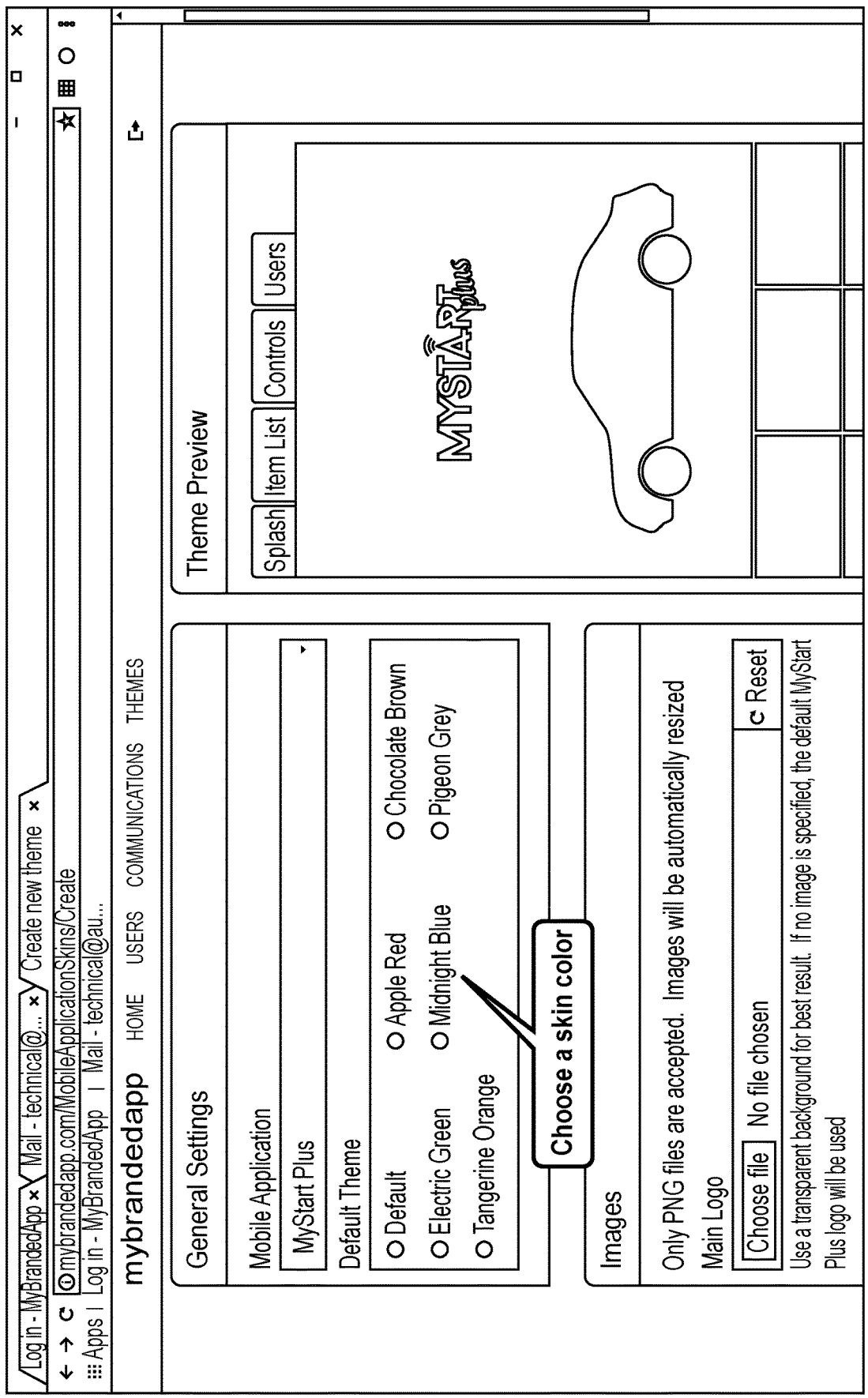
FIG. 20 is a screenshot showing the choose skin colour page of the dealer interface in accordance with one embodiment of the present invitation.
Figure 21:
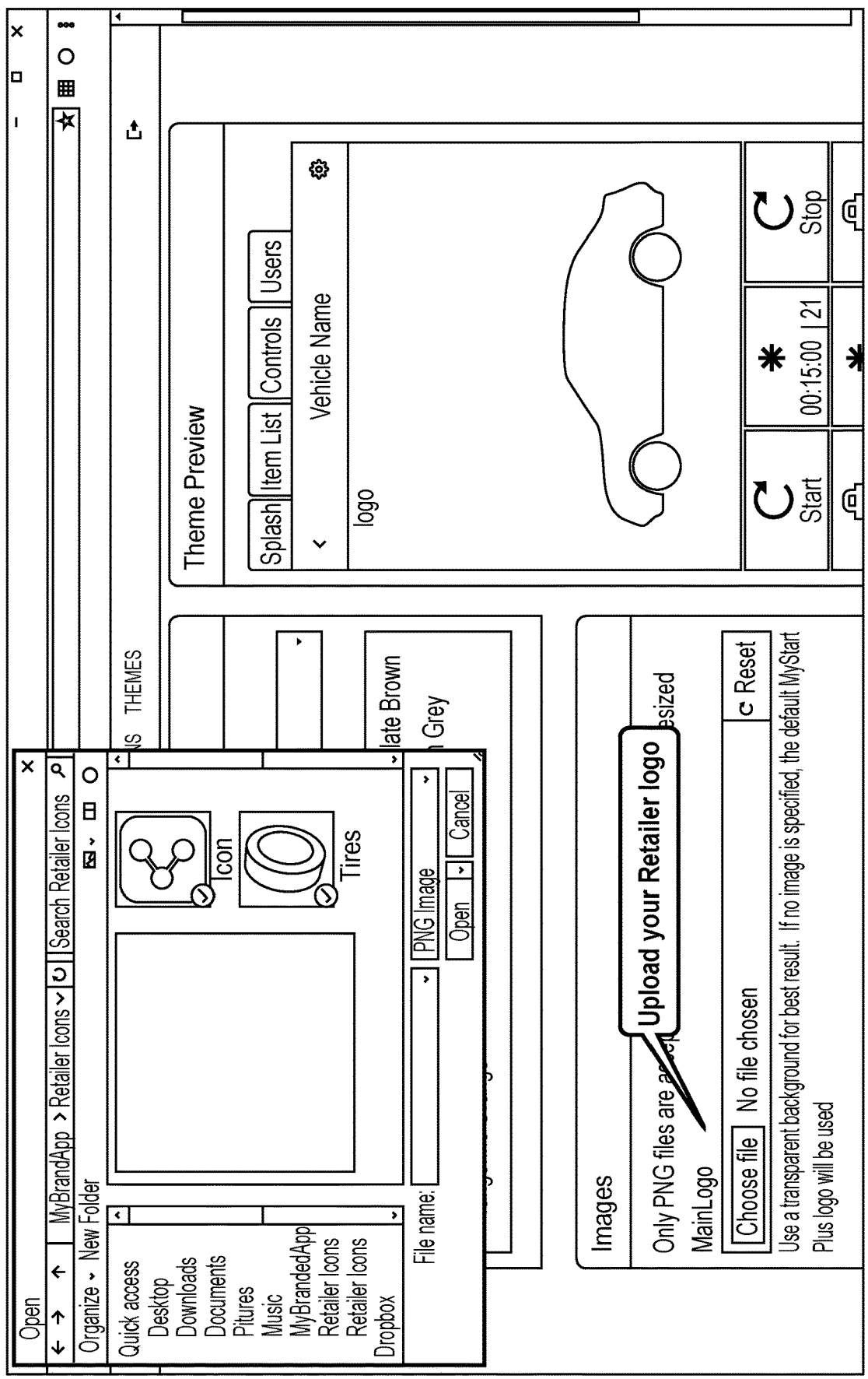
FIG. 21 is a screenshot showing the upload dealer/retailer logo page of the dealer interface in accordance with one embodiment of the present invitation.
Figure 22:
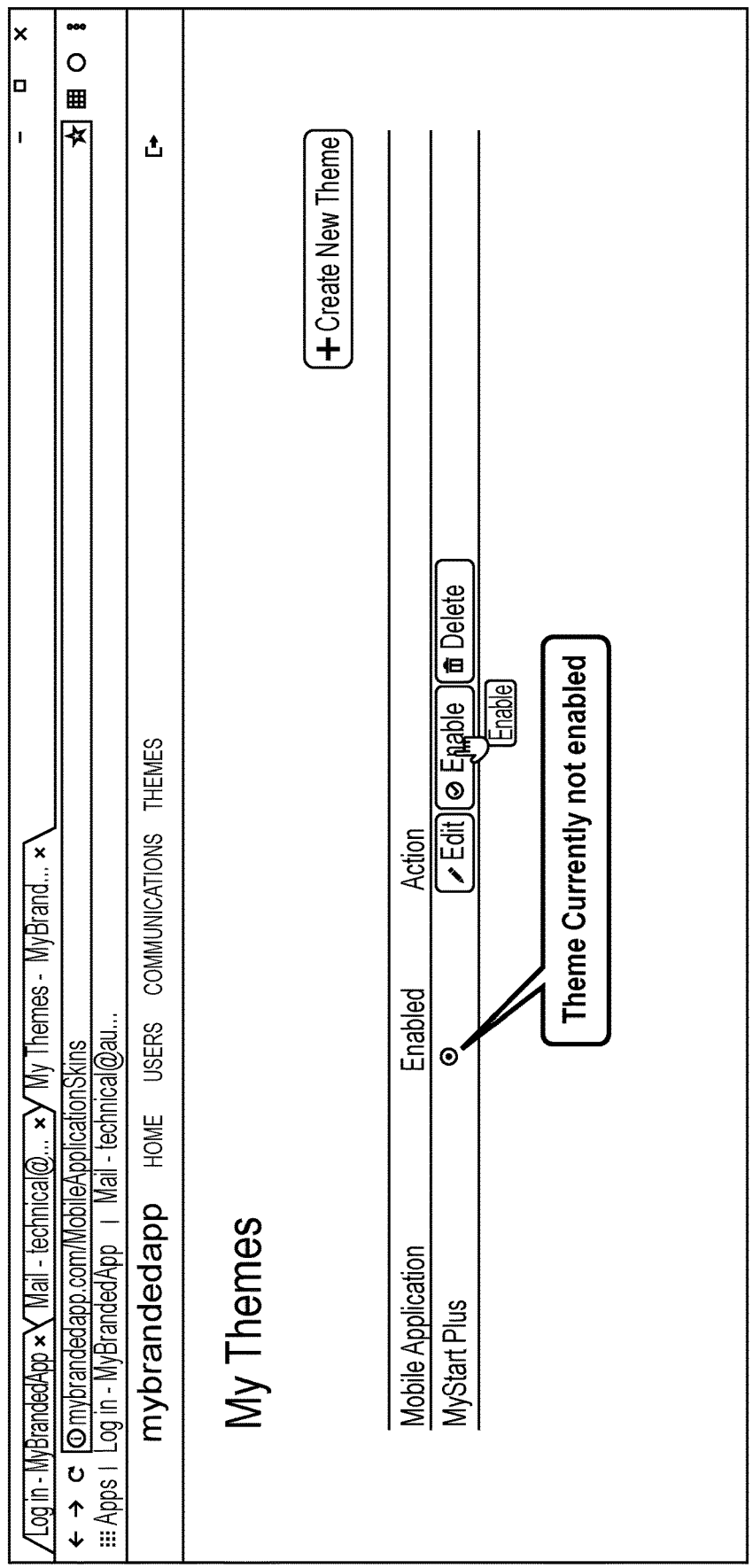
FIG. 22 is a screenshot showing the enable theme page of the dealer interface in accordance with one embodiment of the present invitation in accordance with one embodiment of the present invitation.
Figure 23:
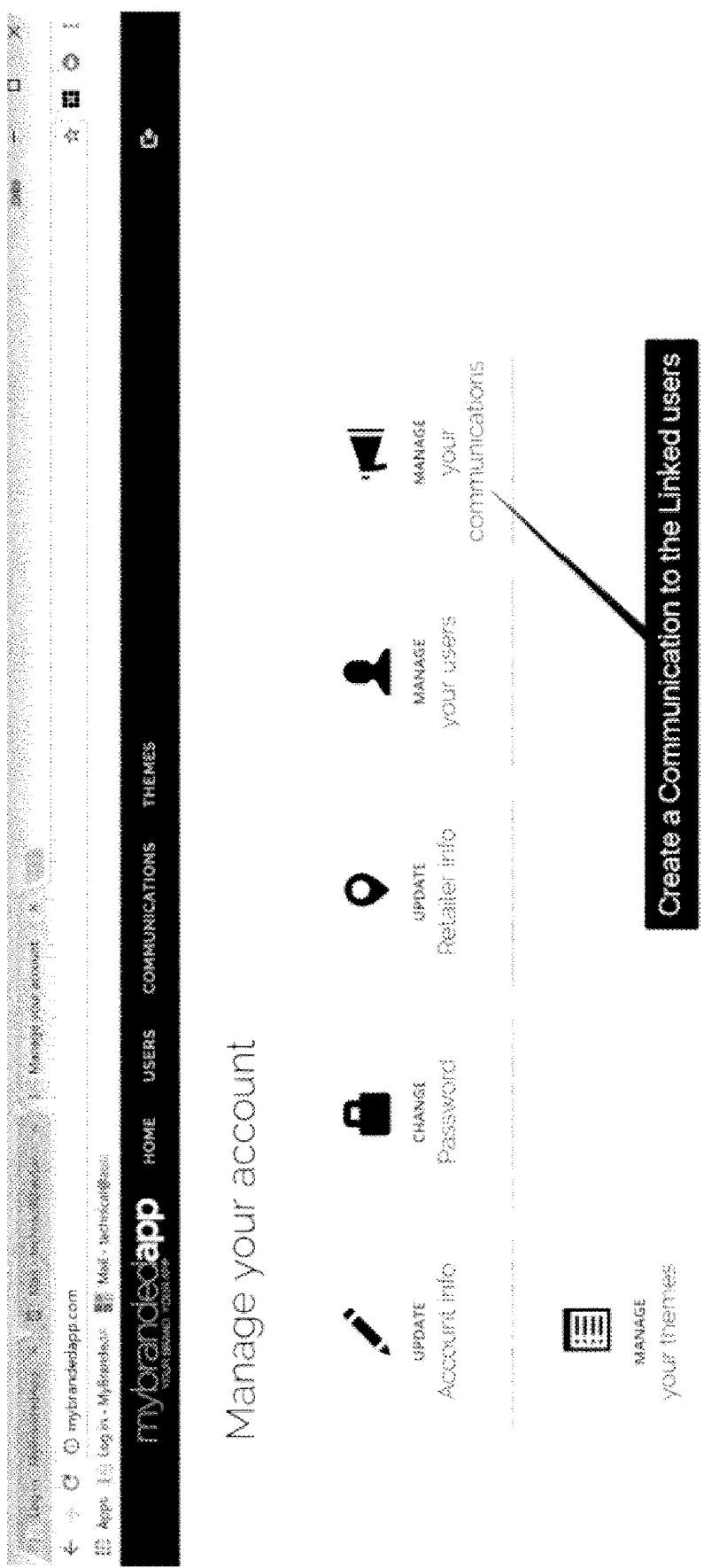
FIG. 23 is a screenshot showing the create communication page of the dealer interface in accordance with one embodiment of the present invitation.
Figure 24:
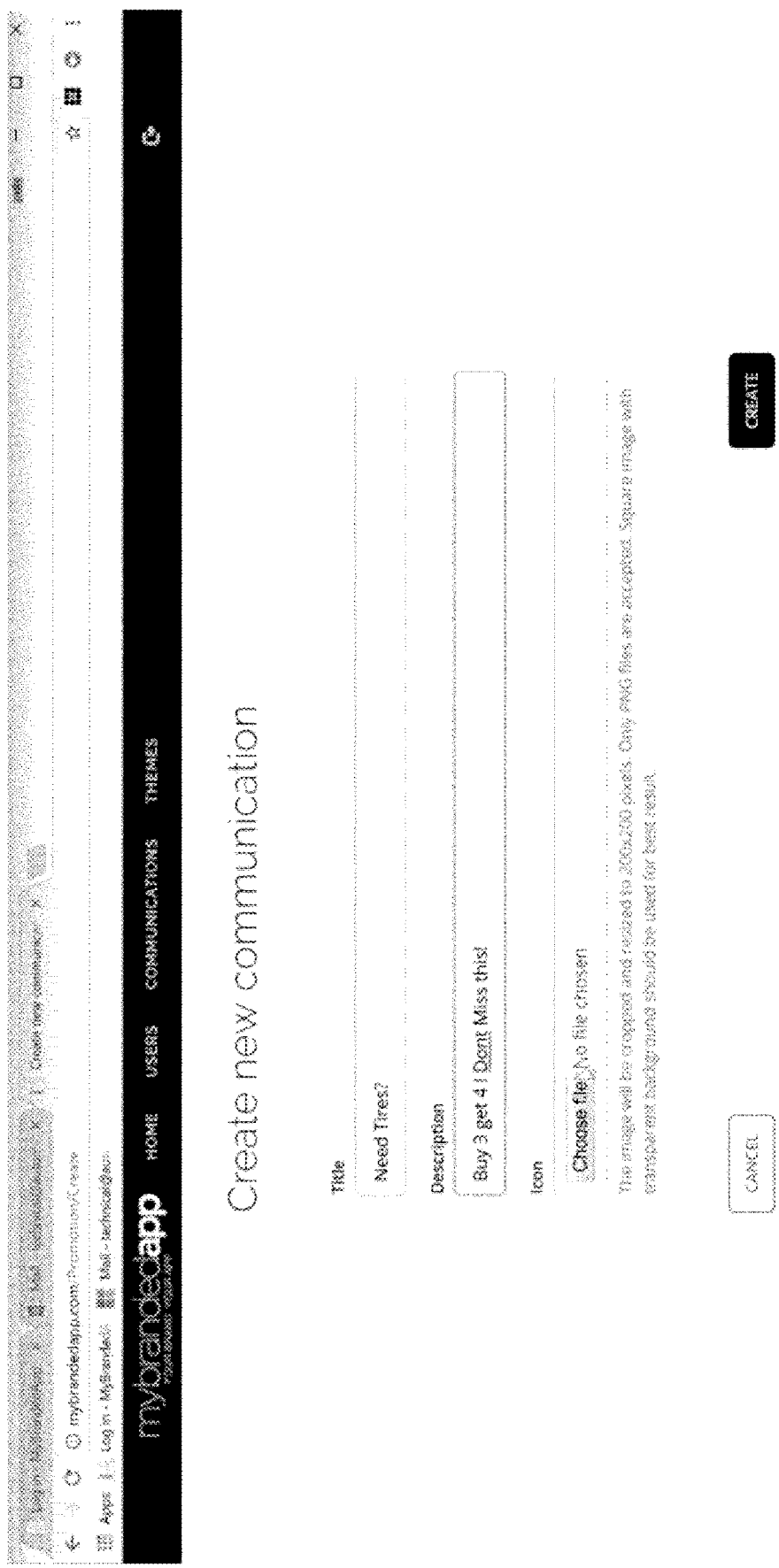
FIG. 24 is a screenshot showing the specified communication page of the dealer interface in accordance with one embodiment of the present invitation.
Figure 25:
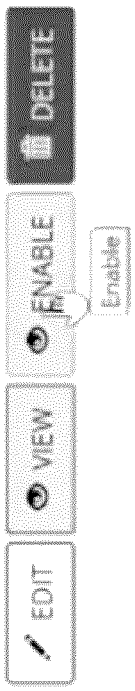
FIG. 25 is a screenshot showing the enable marketing campaign page of the dealer interface in accordance with one embodiment of the present invitation.
Figure 26:
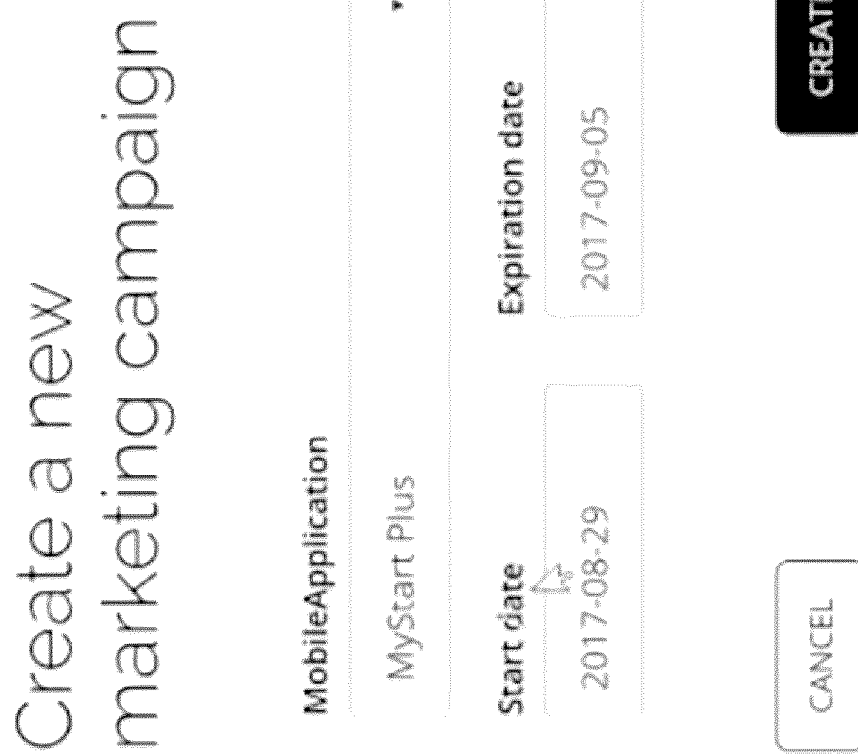
FIG. 26 is a screenshot showing the campaign specification page of the dealer interface in accordance with one embodiment of the present invitation.
Figure 28:
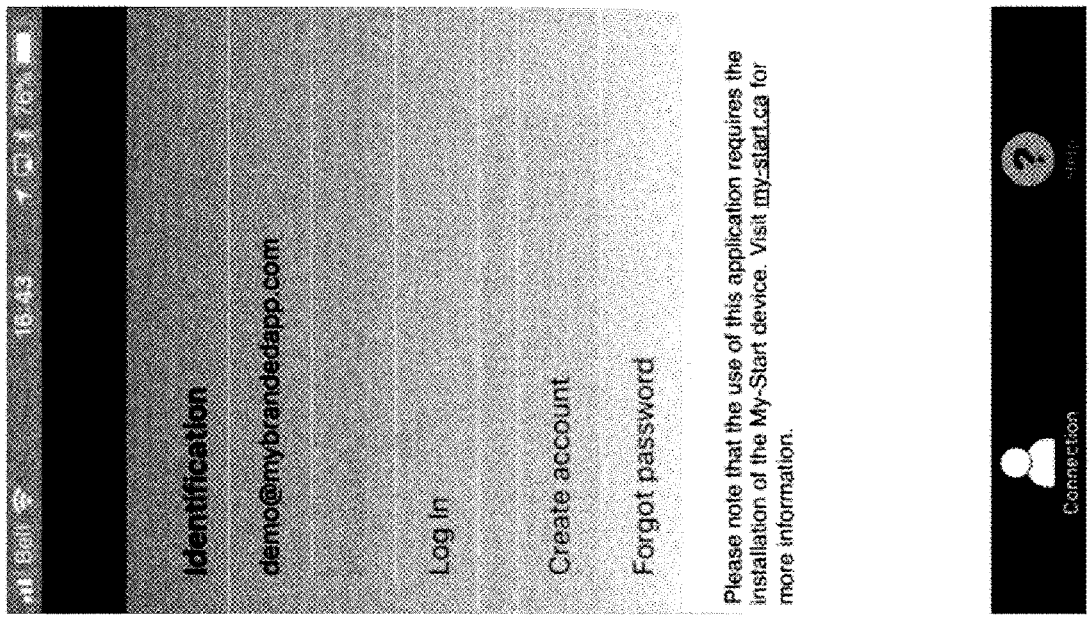
FIG. 28 is a screenshot showing the login page of the user App in accordance with one embodiment of the present invitation.

FIG. 18 shows a screenshot of the service provider or dealer profile interface after creation and validation in accordance with one embodiment of the present application.

FIGS. 19 to 26 show the steps taken by a service provider/dealer on the service provider interface to create new skin and advertisement content in accordance with one embodiment of the present application. The steps including the create new theme page of the dealer profile interface, the choose skin color page of the dealer profile interface, the upload dealer/retailer logo page of the dealer profile interface, the enable theme page of the dealer profile interface, the create communication page of the dealer profile interface, the specify communication page of the dealer profile interface, the enable marketing campaign page of the dealer profile interface and the campaign specification page of the dealer profile interface.

Figure 27:
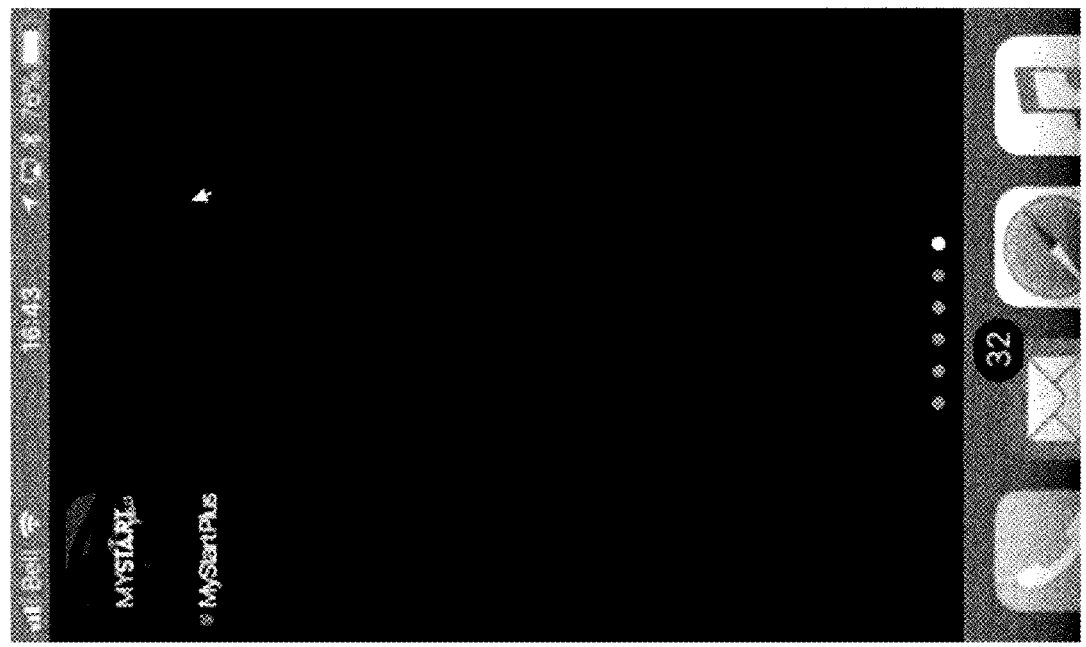
FIG. 27 is a screenshot showing the user app icon in accordance with one embodiment of the present invitation.
Figure 30:
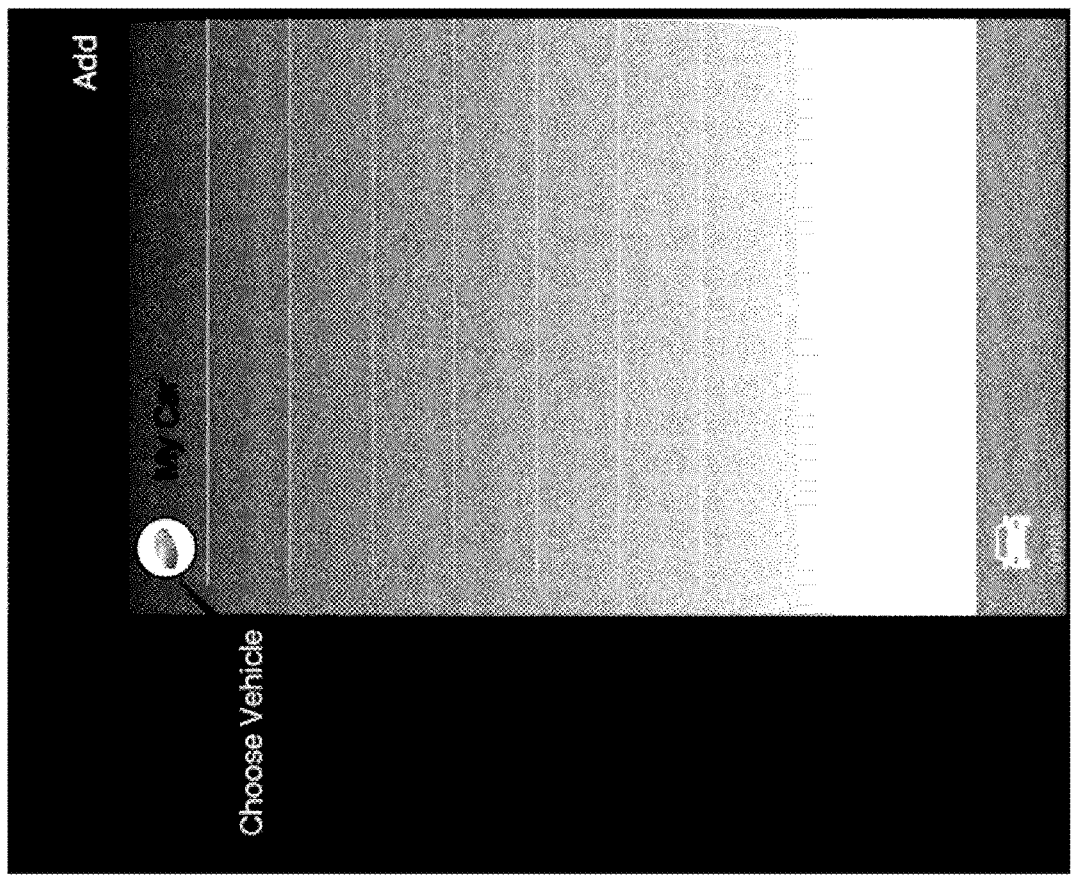
FIG. 30 is a screenshot showing the choose a vehicle page of the user App in accordance with one embodiment of the present invitation.
Figure 29:
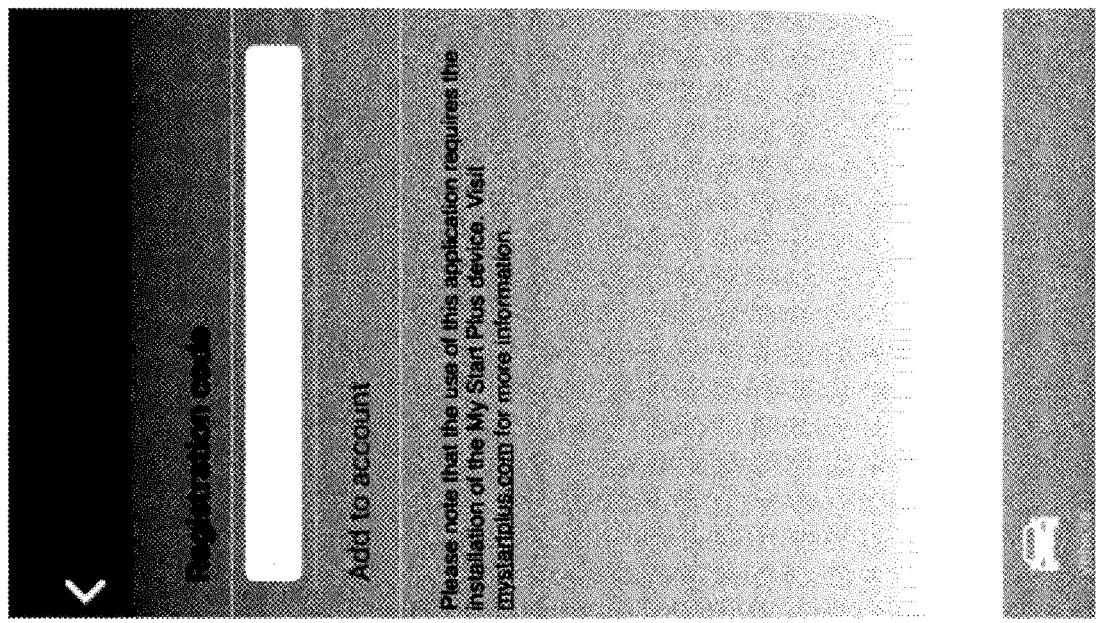
FIG. 29 is a screenshot showing the input code page of the user App in accordance with one embodiment of the present invitation.
Figure 32:
FIG. 32 is a screenshot showing the load skin page of the user App in accordance with one embodiment of the present invitation.
Figure 31:
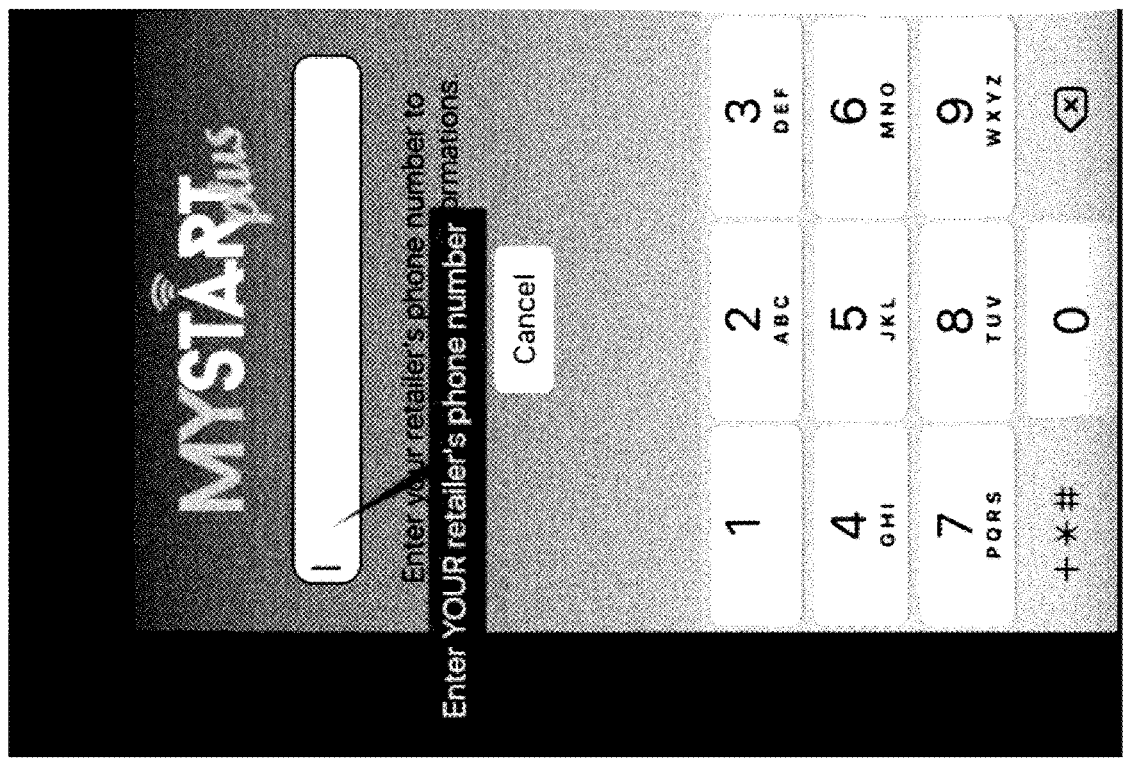
FIG. 31 is a screenshot showing the identify retailer/dealer page of the user App in accordance with one embodiment of the present invitation.
Figure 36:
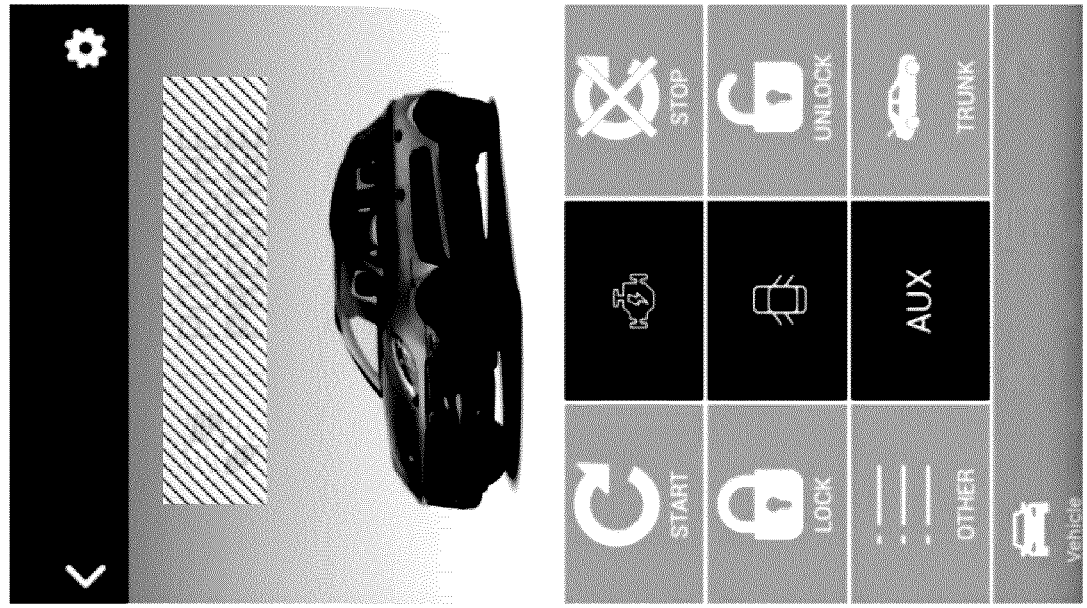
FIG. 36 is a screenshot showing the device control interface page of the user app customized and with the dealer information in accordance with one embodiment of the present invitation.
Figure 35:
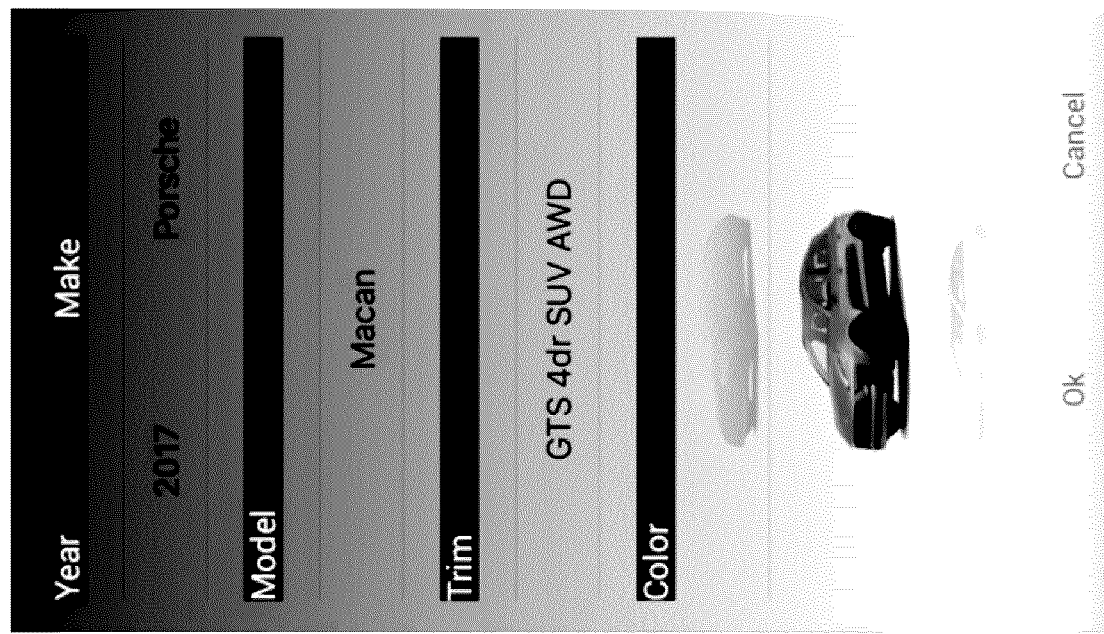
FIG. 35 is a screenshot showing the car customize page of the user App in accordance with one embodiment of the present invitation.
Figure 38:
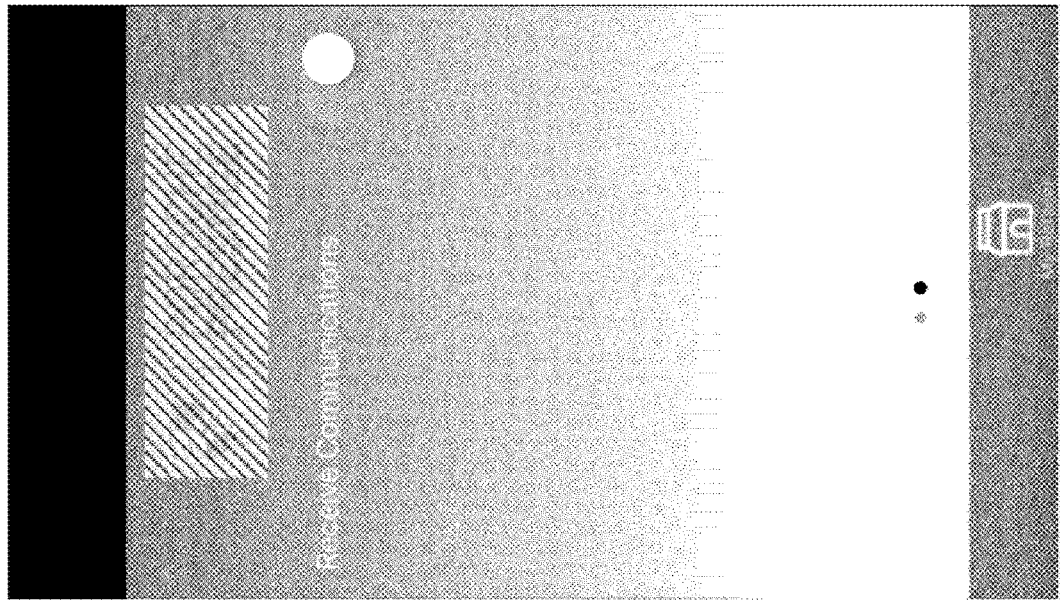
FIG. 38 is a screenshot showing the notification setting page of the user App in accordance with one embodiment of the present invitation.
Figure 37:
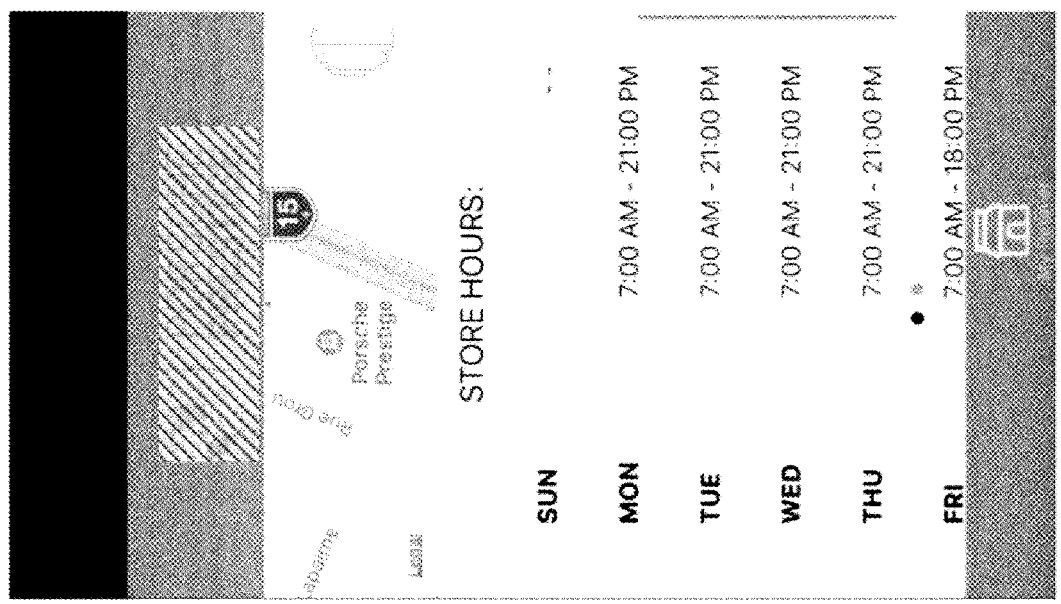
FIG. 37 is a screenshot showing the retailer hour page of the user App in accordance with one embodiment of the present invitation.
Figure 40:
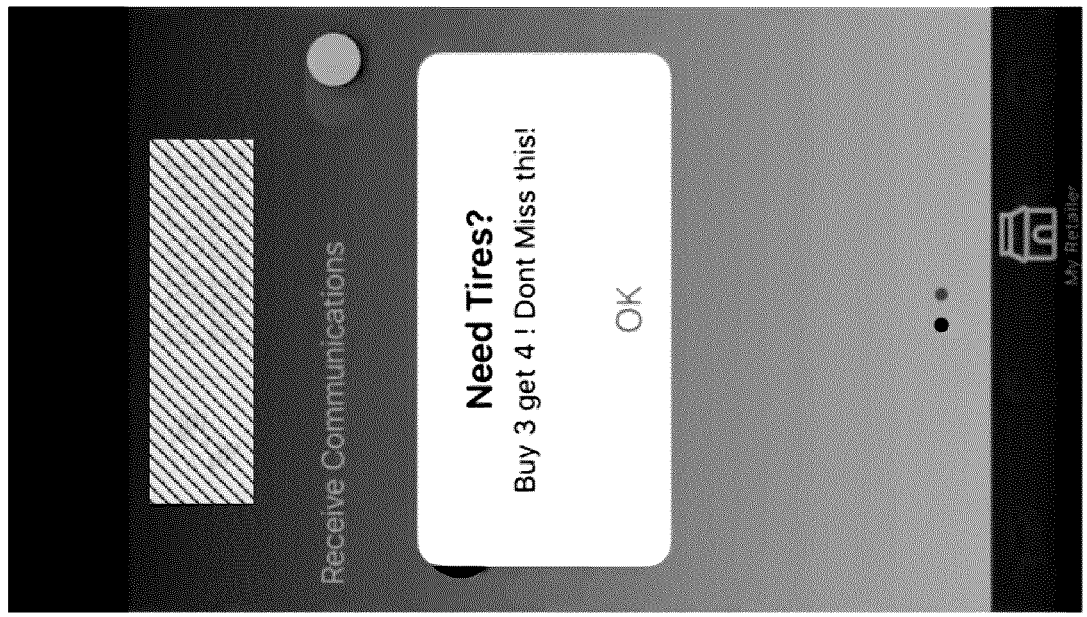
FIG. 40 is a screenshot showing the promotion campaign in-app notification in accordance with one embodiment of the present invitation.
Figure 39:
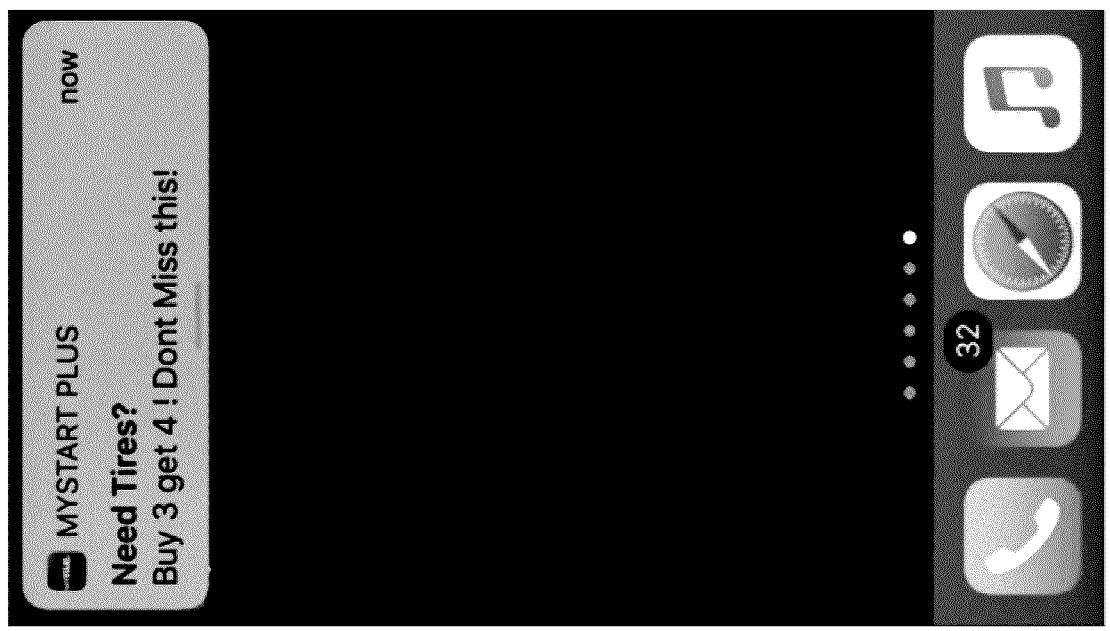
FIG. 39 is a screenshot showing the promotion campaign on phone (outside the App) notification in accordance with one embodiment of the present invitation.

Referring to FIG. 27, a screenshot of the user application icon, the generic application, on an end device screen is illustrated in accordance with one embodiment of the present invitation. FIGS. 28-32 show screenshots of the pages and the steps the user takes to register the application and receive the skinning in accordance with one embodiment of the present disclosure. The steps includes logging in, inputting registration code or serial number, choosing a vehicle, identifying the retailer/dealer, and loading skin.

FIGS. 33 to 40 show the application after initiation by the user in accordance with one embodiment of the disclosed system. The pages include: the "my retailer" page, the "my car/vehicle" page, the car customize page of the user Application, the device control interface page, the retailer hour page, the notification setting page, the promotion campaign on phone notification (outside the App), and the promotion campaign in-application notification page.

The invention claimed is:

1. A method for providing to users of devices, to be controlled by an application program running on mobile computers of the users, branding and advertising information about a supplier associated with a sale or service of the devices, the method comprising:
  providing a number of said devices, wherein each device has an identifier associated to a corresponding supplier or its associated agent;
  providing an interface for use by said supplier or its associated agent to register said identifier and to allow said supplier or its associated agent to define said branding and advertising information or to associate said identifier to branding and advertising information content;
  storing in a database information corresponding to an association between said identifiers of said each device and said corresponding supplier or its associated agent;
  providing a generic mobile computer application with a generic appearance and at least one interface element operable to control said devices as resold by said supplier or its associated agents, said generic mobile computer application being stored on an application server for download by the users and installation on said mobile computers, wherein said generic mobile computer application comprises instructions to:
    communicate with said database over a data network to determine one or more network addresses for at least one server corresponding to said identifier and to enable said at least one interface element to control said devices, said at least one server storing said branding and advertising information about said supplier or its associated agent;
    retrieve a specific appearance and said branding and advertising information associated with said corresponding supplier or its associated agent;
    store said specific appearance in memory for repeated use without further retrieval from said remote server; and
    replace said generic appearance with said specific appearance while preserving said at least one interface element;
  receiving communication from said generic mobile computer application for determining one or more network addresses for at least one server storing said branding and advertising information about said supplier, wherein said one or more network addresses is determined using said association information stored in said database; and
  providing over a network in communication with said generic mobile computer application installed on said mobile computers of said users said branding and advertising information from said at least one server.

2. The method of claim 1, wherein said providing a number of said devices comprises providing to a distributor, and said storing in a database information corresponding to an association between said identifiers of each device and said corresponding supplier or its associated agent comprises receiving over a computer network the identity of one of said suppliers from said distributor.

3. The method of claim 1, wherein said generic mobile computer application is configured to communicate with a predetermined address or URL.

4. The method of claim 1, comprising providing a portal interface for said suppliers to upload said branding and advertising information for storage on said at least one server.

5. The method in claim 1, wherein said storing in a database information corresponding to an association between said identifiers of each device and said corresponding supplier or its associated agent comprises:
  registering said identifier each time that one of said devices is sold using said interface for use by said supplier or its associated agent;
  associating said identifier to said branding and advertising information defined by said supplier or its associated agent.

6. The method of claim 1, wherein said storing in a database information corresponding to an association between said identifiers of each device and said corresponding supplier or its associated agent comprises:
  registering said identifier on a dynamic correspondence table of device identifier to branding and advertising information content addresses each time that one of said devices is sold using said interface for use by said supplier or its associated agent;
  searching for said identifier on a dynamic correspondence table of device identifier to branding and advertising information content addresses;
  providing said generic mobile computer application with a corresponding branding and advertising information address having said branding and advertising information.

7. The method of claim 1, wherein said interface and said corresponding branding and advertising information addresses are located on one server.

8. The method of claim 1, wherein said interface and said corresponding branding and advertising information addresses are located on separate servers.

9. A system for providing branding and advertising information to a generic mobile computer application, the system comprising:
  a device with an identifier associating said device with said supplier or its associated agent;
  a server comprising a database for storing association information corresponding to said association between said identifier of said device and said supplier or its associated agent, wherein said database contains one or more network addresses for at least one supplier server storing a branding and advertising information of said supplier or its associated agent;

a memory storing a generic mobile computer application operable to control said associated device, said generic mobile computer application to be downloaded into the mobile computing device for execution thereon, wherein said server comprising said database and said generic mobile computer application comprise instructions which, when executed in combination, perform the method of claim 1.

10. The method of claim 1, wherein said storing in a database comprises storing said database on said at least one server.

11. The method of claim 1, wherein said providing a number of said devices further comprises associating each of said identifiers to one of said users.

12. The method of claim 1, wherein said replacing in memory said generic appearance with said specific appearance includes replacing at least one background object from said generic appearance with at least one background object from said specific appearance.

\* \* \* \* \*